United States Patent [19]
Hoyt, Jr.

[11] 3,810,084
[45] May 7, 1974

[54] ELECTRONIC TRAFFIC SIGNAL CONTROL SYSTEM

[75] Inventor: Harold C. Hoyt, Jr., St. Louis, Mo.

[73] Assignee: Meyer Labs, Inc., St. Louis, Mo.

[22] Filed: Mar. 23, 1971

[21] Appl. No.: 127,134

[52] U.S. Cl............................................. 340/41 R
[51] Int. Cl............................................. G08g 1/085
[58] Field of Search............. 340/35, 36, 37, 40, 41

[56] References Cited
UNITED STATES PATENTS

| | | | |
|---|---|---|---|
| 3,644,884 | 2/1972 | Matysek | 340/40 |
| 3,434,016 | 3/1969 | Curtis | 340/41 |
| 3,251,030 | 5/1966 | Bolton et al. | 340/41 |
| 3,525,980 | 8/1970 | Schmidt et al. | 340/41 |
| 3,384,871 | 5/1968 | Selzer et al. | 340/37 |
| 3,605,084 | 9/1971 | Matysek | 340/40 |
| 3,594,720 | 7/1971 | Cane | 340/37 |
| 3,376,546 | 4/1968 | Cress, Jr. et al. | 340/37 |
| 3,482,208 | 12/1969 | Auer, Jr. et al. | 340/35 |
| 3,414,878 | 12/1968 | Smith | 340/41 |

*Primary Examiner*—Kathleen H. Claffy
*Assistant Examiner*—Randall P. Myers
*Attorney, Agent, or Firm*—Ralph W. Kalish

[57] ABSTRACT

An electronic traffic signal control system. Logic circuitry is included for providing a sequence of timed changing logic states which define operating periods for a plurality of signal lights. Control means is responsive to the changing logic states for selectively energizing predetermined ones of the signal lights during each of respective operating periods defined by the logic states. Timing circuitry generates timing pulses for causing successive changing of the logic states. Provision is made for manually varying the timing of generation of the timing pulses for preselecting the lengths of the respective operating period defined by each of the logic states.

14 Claims, 13 Drawing Figures

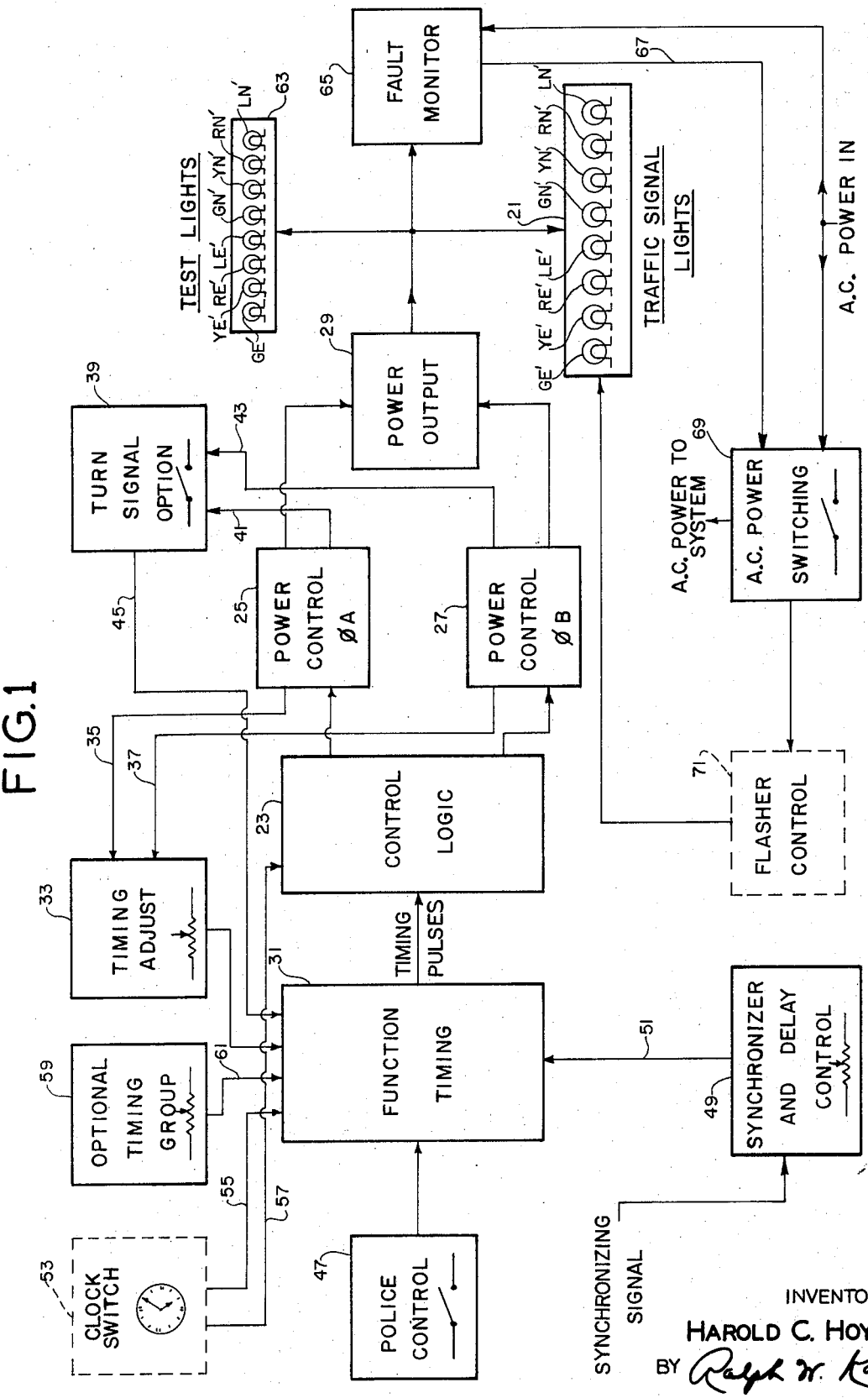

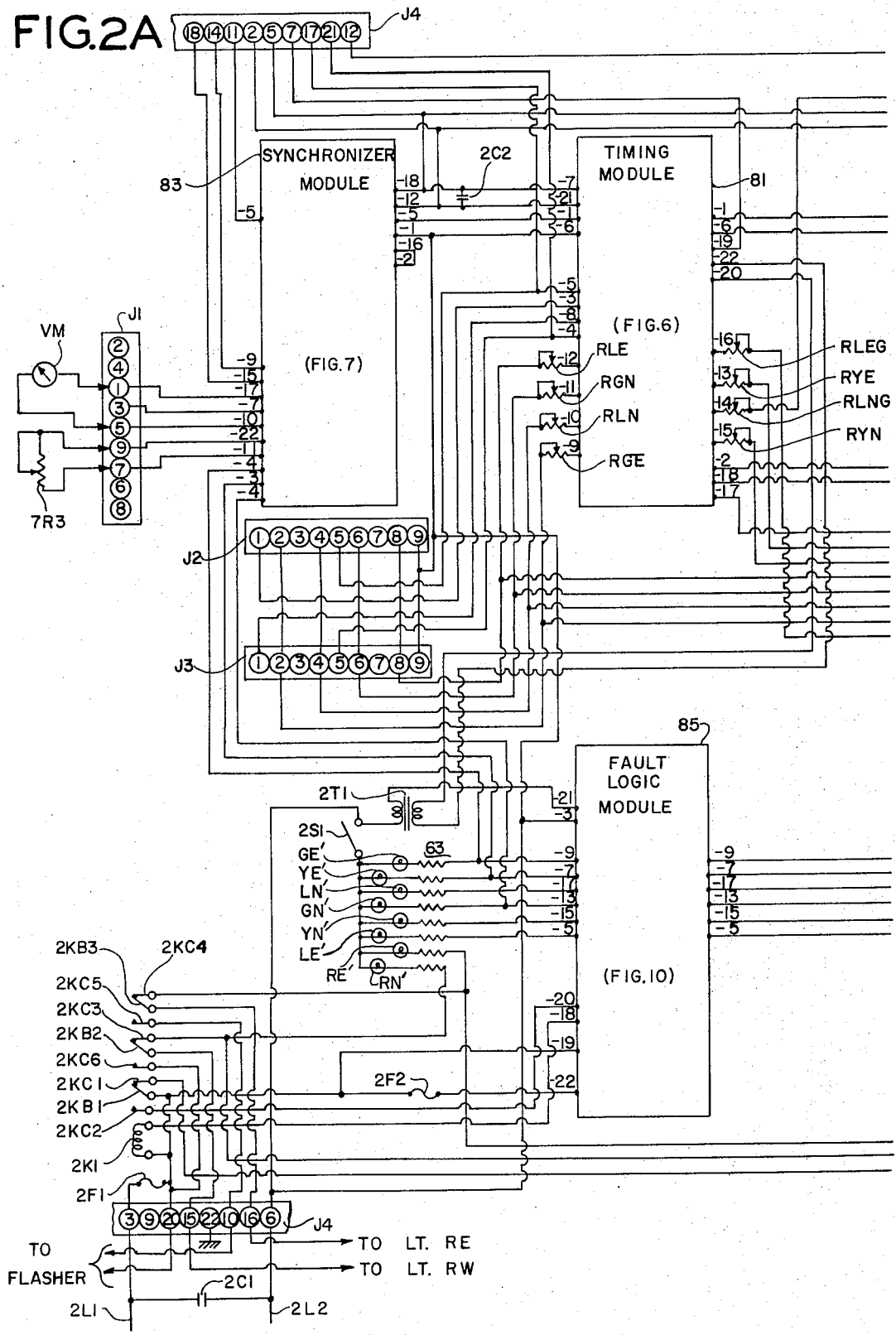

TO SIGNAL LIGHTS
(EXCEPT RE+RN)

FAULT LOGIC MODULE 85

ELECTRONIC TRAFFIC SIGNAL CONTROL SYSTEM

BACKGROUND OF THE INVENTION

This invention relates to traffic signal control systems and more particularly to electronic traffic signal control systems of the pre-timed, multiphase type.

Traffic signal controllers of the prior art have been of either mechanical (i.e., electromechanical) or electronic types. Mechanical controllers typically employ motor-driven drum switches which operate switching contacts. After prolonged continuous use, such contacts may stick together, break off or become otherwise inoperative. In general, mechanical controllers include moving parts which are subject to failure in use, such as through wear. On the other hand, electronic controllers have heretofore been typically complex and expensive. Further, because of their complication, such controllers may be difficult to initially place in operation, and may involve difficult or confusing programming as with pegboards or the like. Further, previous electronic controllers have not been fully reliable. More significantly, however, such controllers have generally included no provision for sensing when the operation of the controller is improper.

Regardless of the type, prior art controllers have also included such limitations or disadvantages as narrow range of adjustment; limited flexibility in use, i.e., limited facility for changes in capability as use requirements vary; and have caused difficulty in installing, adjusting or testing and difficulty in servicing and maintaining.

A frequently encountered requirement in the use of controllers of the present type is that the operation of the controller be synchronized with the operation of other controllers such as at other intersections. Such synchronization is conventionally effected through the use of a synchronizing signal carried on a synchronization line to which a plurality of controllers are connected. This synchronizing signal is conventionally constituted by utility service a.c. line voltage which is periodically interrupted (through the operation of a "master" controller) to cause operation by other controllers "slaved" to the master controller by the virtue of being commonly connected to synchronization line. A problem sometimes encountered in the use of prior art controllers which are synchronized in this manner results because the cycle of operation of each slaved controller is typically halted at some point and then caused to resume (thereby effecting synchronized operation) by either the interruption or the return of the a.c. synchronizing signal. If the controller of the type in which the cycle of operation is resumed when the synchronizing signal returns, normal controller operation may be indefinitely halted if, for example, the synchronization line should break. Where several controllers of this type are connected to the same synchronization line, a break in the line may cause all of the controllers to become inoperative, terminating traffic signal operation at each of several intersections. On the other hand, if the controllers are of the type wherein the cycle of operation is caused to resume when the synchronizing signal is interrupted, a failure of the master controller to interrupt the a.c. line voltage on the synchronization line will cause operation of all of the slaved controllers to cease, again resulting in several intersections being affected, presenting the possibility of a massive traffic jam. Not only do types of failures occur in the operation of traffic signal control systems, but another type of failure may result where the synchronizing signal is intermittently present. This may be caused by an intermittent or faulty connection in the synchronization line, for example. In the use of prior art controllers, this intermittent condition can result in irregular operation of all of the slaved controllers with corresponding interruption of normal traffic flow.

BRIEF SUMMARY OF THE INVENTION

Among the several objects of the invention may be noted the provision of an electronic traffic signal control system; the provision of such a system which is solid state in design, utilizing microcircuitry, and utilizing no moving parts during normal operation; the provision of such a system adapted for multiphase traffic control; the provision of such a system including provision for optional controlling of left turn signals; the provision of such a system including provision for switching signal timing to one or more auxiliary time groups, under time switch control (for changing signal light operating periods) and for switching under control of such a time switch to a flashing signal mode of operation; the provision of such a control which is adjustable over a wide range of preset signal light operating periods; the provision of such a control which is easily installed and placed in service, easily adjusted, and easily tested; the provision of such a control which has great flexibility in use and, for this purpose, which is modular in design to facilitate the addition or deletion of features and options for changing the system capabilities in accordance with varying use requirements; the provision of such a control which is fail-safe in operation, including a provision for this purpose which automatically monitors operation of the system and initiates signal flasher operation in response to a malfunction; the provision of such a control which, while being of the pre-timed type, i.e., a local controller, can be synchronized, or slaved, to the operation of other controllers by means of a synchronizing signal, but which reverts to pre-timed operation in response to failure of the synchronizing signal and wherein operation is not substantially affected by an intermittent condition of the synchronizing signal; the provision of such a system which can be used either as a local controller or to generate a synchronizing signal as a master controller to which other controllers are slaved; the provision of such a system which is highly accurate over a wide range of temperatures and which operates with high reliability and long-life; and the provision of such a system which is economical and relatively simple to manufacture. Other objects and features will be in part apparent and in part pointed out hereinafter.

Briefly, a solid state electronic traffic signal control system of the present invention comprises a local controller which is adapted for multiphase control of a plurality of traffic signal lights. The system includes logic means including a code generator for generating a repeating coded sequence of timed logic states and a decoder for defining operating periods for the signal lights according to this coded sequence. Control circuitry having a plurality of semiconductor current switching devices is operative in response to the decoder for selectively energizing predetermined one of the signal lights during each of respective operating periods defined by these logic states. Timing means is responsive to selective energization of the signal lights and is operative to generate timing pulses for causing the code generator to generate the successive logic states. Means is provided for manually varying the timing of generation of the timing pulses, permitting preselection of length of the respective operating period defined by each of the said logic states. In accordance with the preferred embodiment of the invention, the system also includes fault monitoring circuitry which terminates traffic control operation of the system in response to energization of an unsafe combination of signal lights and instead causes flasher operation of red signal lights.

BRIEF DESCRIPTION OF THE DRAWINGS

FIG. 1 is a block diagram of a system of the invention;

FIGS. 2A and 2B together constitute a master schematic circuit diagram showing the overall layout of and interconnection between various circuit modules of the preferred embodiment of the invention;

Corresponding reference characters indicate corresponding parts throughout the several views of the drawings.

GENERAL DESCRIPTION OF THE PREFERRED EMBODIMENT

Figure 2B:
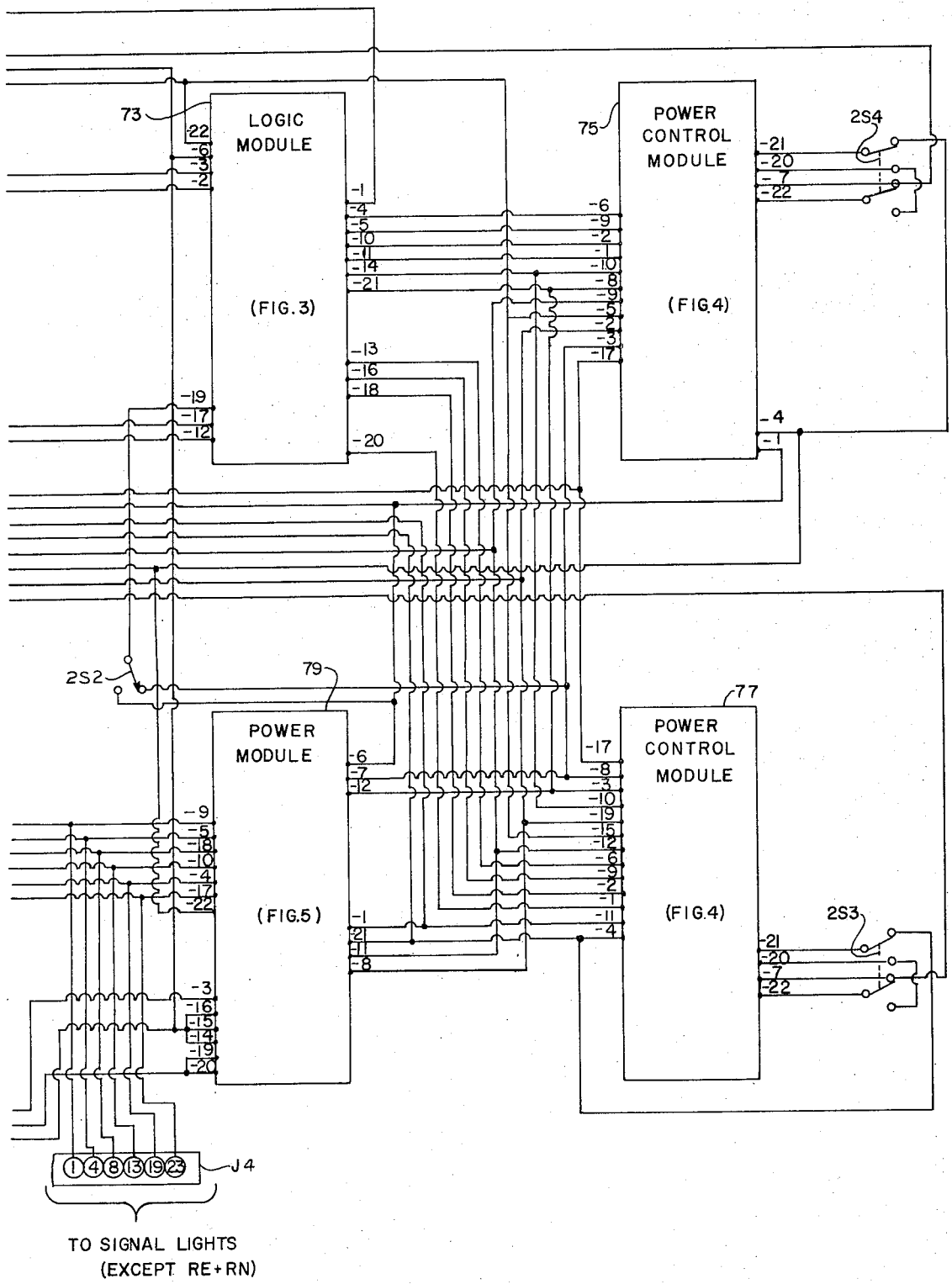

Referring to FIG. 1, a traffic signal control system, or traffic controller, of this invention is adapted for multiphase control of a plurality of traffic signal lights 21. As is known in the art, multiphase control implies that a plurality of traffic phases are controlled, there being one complete series of traffic control functions including at least green, yellow (or amber), and red signal lights for one or more directions of traffic flow. For example, an intersection defined by a pair of streets which cross or join suggests two phases of traffic, each phase corresponding to traffic moving in either direction along a respective one of such streets.

For purposes of simplifying illustration, it is assumed hereinafter that the present controller is utilized for two-phase control of an intersection defined by an East-West steet along which traffic flows in both directions. Traffic along the East-West street is hereinafter referred to as phase A. Traffic is similarly assumed to flow along the North-South street in both directions and is referred to as phase B. For convenience, the East-West street is assumed to be the principal artery, or "main" street, and the North-South street is assumed to be a street of secondary importance, or "side" street, in determining priority of traffic control. Notwithstanding these assumptions, however, it will be apparent that the controller is fully adapted for control of one-way traffic, including half-plus-half phase control, or one-plus-half phase, and so forth.

It is further assumed that the present controller can control left turn signals for both directions of both traffic phases in addition to the conventional green, yellow and red signals for each traffic phase. Regardless of their number or their positioning with respect to the intersection, there are thus assumed to be the following traffic signal lights and which are identified as shown in parentheses:

| | |
|---|---|
| green—east (GE) | green—west (GW) |
| yellow—east(YE) | yellow—west(YW) |
| red—east(RE) | red—west(RW) |
| left—east(LE) | left—west(LW) |
| green—north(GN) | green—south(GS) |
| yellow—north(YN) | yellow—south(YS) |
| red—north(RN) | red—south(RS) |
| left—north(LN) | left—south(LS) |

The present controller is adapted to cause concurrent operation of the respective signal lights of one color for both directions of traffic flow of either phase: e.g., green-eat (signal light GE) is energized concurrently with green-west (signal light GW); signal light LN is energized concurrently with signal light LS, and so forth. Accordingly, for simplicity, reference is in general made hereinafter only to the following signal lights, viz., GE, YE, RE, LE, GN, YN, RN, and LN. Such ones of signal lights 21 are so-designated in FIG. 1. The presence and concurrent operation of the corresponding signal lights such as GW, YW, RW, etc., is then assumed.

In general, the present controller includes control logic means 23 which includes a code generator for generating a repeated coded sequence of timed logic states and a decoder for defining operating periods of the signal lights 21 according to this coded sequence. Control means including a first power control circuit 25 for traffic phase A, a second power control circuit 27 for traffic phase B, and a power output circuit 29 are shown functionally interconnected with the control logic 23. The power output circuit 29 comprises a plurality of semiconductor current switching devices whose triggering is controlled by power controls 25 and 27 in response to the operation of the decoder of control logic 23 thereby to selectively energize predetermined ones of the signal lights 21 during each of respective operating periods defined by the timed logic states.

Function timing circuitry 31 is shown functionally interconnected with the control logic 23 and operates to generate timing pulses for causing the code generator of logic 23 to generate successive logic states. Timing adjustment means 33 interconnected with the timing circuit 31 permits manually varying the timing of generation of the timing pulses. This permits preselection, i.e., presetting of the length of the respective operating period defined by each of said logic states. Functional interconnections 35 and 37 are shown between timing adjustment means 33 and the respective controls 25 and 27, providing a type of feedback for causing the timing circuit 31 to be responsive to the selective energization of the signal lights 21.

A turn signal option circuit is designated 39 and allows manual preselection between a first type of controller operation wherein left turn signal lights (i.e., signal lights LN and LE) are normally energized during the normal operation cycle and a second type of operation wherein energization of the left turn signal lights for either phase of traffic is prevented. Option circuit 39 is shown functionally interconnected, as indicated at 41 and 43 with the power control circuits 25 and 27, respectively. A functional interconnection 45 between turn option circuit 39 and timing circuit 31 is provided for causing accelerated generation of a timing pulse when energization of turn signal lights (LN or LE) is prevented. This has the purpose of causing accelerated changing of the logic state defining an operating period for the turn signal light.

A police control circuit is indicated at 47 and is functionally interconnected with the timing circuit 31 in order to provide means for manually controlling the generation of timing pulses. This permits a police officer, for example, to manually control the energization, or changing, of the signal lights 21.

A synchronizer circuit 49 is optionally included in the controller where it is desired to line-synchronize control of the signal lights 21 with events occurring externally of the system, i.e., with other controllers at other intersections. As previously mentioned, such synchronization is effected by means of a synchronization line carrying an a.c. line voltage synchronizing signal. This signal is provided to circuit 49, as indicated, which operates in response to this signal to alter the timing of changing the logic states provided by the control logic 23. For this purpose, synchronizer 49 is functionally interconnected with the timing circuit 31 as indicated at 51 to control the generation of the timing pulses from the latter circuit. Synchronizer 49 includes a delay means for manually preselecting a time delayed response to the synchronizing signal thereby to adjust this synchronizing function to achieve desired synchronized operation with other intersection signal lights, etc., as dictated by speed of traffic and other considerations.

Another optional feature of the system involves provision of a flasher mode of operation through the use of a conventional clock or time switch 53, which may be of the type conventionally employed for use with prior art controllers. Clock switch 53 is shown functionally interconnected as indicated at 55 and 57 with timing circuit 31 and with control logic 23. The control logic 23 includes control means which is responsive to operation of clock switch 53 for terminating traffic control operation of the system and for initiating flasher operation of predetermined ones (such as RE and RN) of the signal lights at a predetermined time and for causing reversion to normal traffic control operation at a later predetermined time. The frequency of such signal light flashing is under control of the function timing circuit 31.

A further optional feature of the system entails the provision of one or more optional timing group control circuits such as indicated at 59. Optional timing group 59 constitutes auxiliary means for manually varying the timing of generation of the timing pulses from timing circuit 31 and, for that purpose, is functionally interconnected as indicated at 61 with timing circuit 31. Timing circuit 31 includes switching means responsive to operation of clock switch 53 for causing timing group 59 to take priority over timing adjustment circuit 33 so as to provide a varied or different set of signal light operating periods at predetermined times established by clock switch 53. There may be more than one such optional timing group 59.

The various controls of the system, as well as the circuitry of the system, may conveniently be enclosed in a small cabinet-type enclosure of a few inches in each dimension. Timing adjustment knobs or the like which adjust timing components of circuits 33, 59, 49, and so forth, are preferably positioned for access on a face panel of the enclosure. In order to facilitate set-up, adjustment of such controls and others, as well as testing, the system includes test or indicator lights 63 which correspond with respective ones of signal lights 21. The test lights 63, which are preferably small indicator-type panel lights, are mounted for all being viewed simultaneously on the face panel of the system enclosure and are designated to correspond with signal lights 21, viz., GE', YE', RE', LE', GN', YN', RN' and LN'. These indicator lights 63 are interconnected with the power output circuit 29 so as to be energized concomitantly with respective ones of signal lights 21.

In accordance with the present invention, the system includes fault monitoring means 65 which continuously and automatically monitors operation of the system and operates to terminate traffic control operation of the system in response to energization of an unsafe combination of signal lights 21. For this purpose, fault monitor 65 is functionally interconnected as indicated at 67 with a power switching circuit 69 which controls the distribution of a.c. power to various circuits of the system. Circuit 69 is caused to disconnect the a.c. power to circuits other than the fault monitor 65 whenever such an unsafe combination occurs and to instead energize a conventional external flasher control 71 of the type typically used with prior art controllers. Control 71 then causes flasher operation of predetermined ones of signal lights 21, such as the red lights RE and RN.

DETAILED DESCRIPTION OF THE PREFERRED EMBODIMENT a. Overall Circuit Layout

Figure 10:
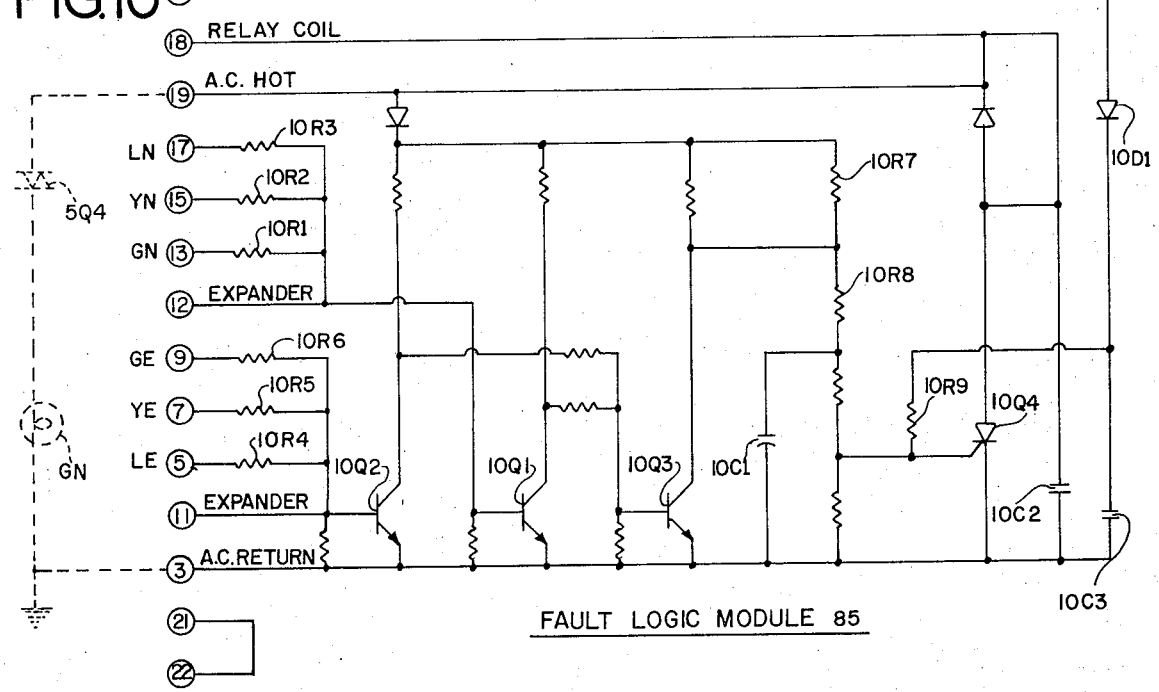
FIG. 10 is a schematic circuit diagram of a fault monitoring module employed in the system of FIG. 2.

Referring to FIG. 2, an overall schematic circuit diagram of the present system or controller, there are shown various interconnected circuit modules, each of which preferably comprises a slide-in type printed circuit card. These modules include a logic module 73 (FIG. 3), a pair of identical power control modules 75 and 77 (FIG. 4), a power module 79 (FIG. 5), a timing module 81 (FIG. 6), a synchronizer module 83 (FIG. 7), and a fault logic module 85 (FIG. 10). Other circuits or modules, described later, are adapted to be connected to certain jacks shown in FIG. 2.

Leads interconnecting the modules are shown connected at terminals along the edges of the modules which terminals are designated throughout the specification by reference numerals having first numerals corresponding to the number of the figure of the drawings which shows the circuitry of the respective modules, and other numerals separated therefrom by a dash and indicating the terminal number. For example, logic module 73 (shown in FIG. 3), includes terminals 3-1, 3-2, and so forth. However, on the drawings, only the numerals indicating the terminal number are shown as digits encircled by the terminal symbol. Terminals of the modules sometimes simultaneously appear on both sides of the module to simplify illustration of circuit connections.

Figure 3:
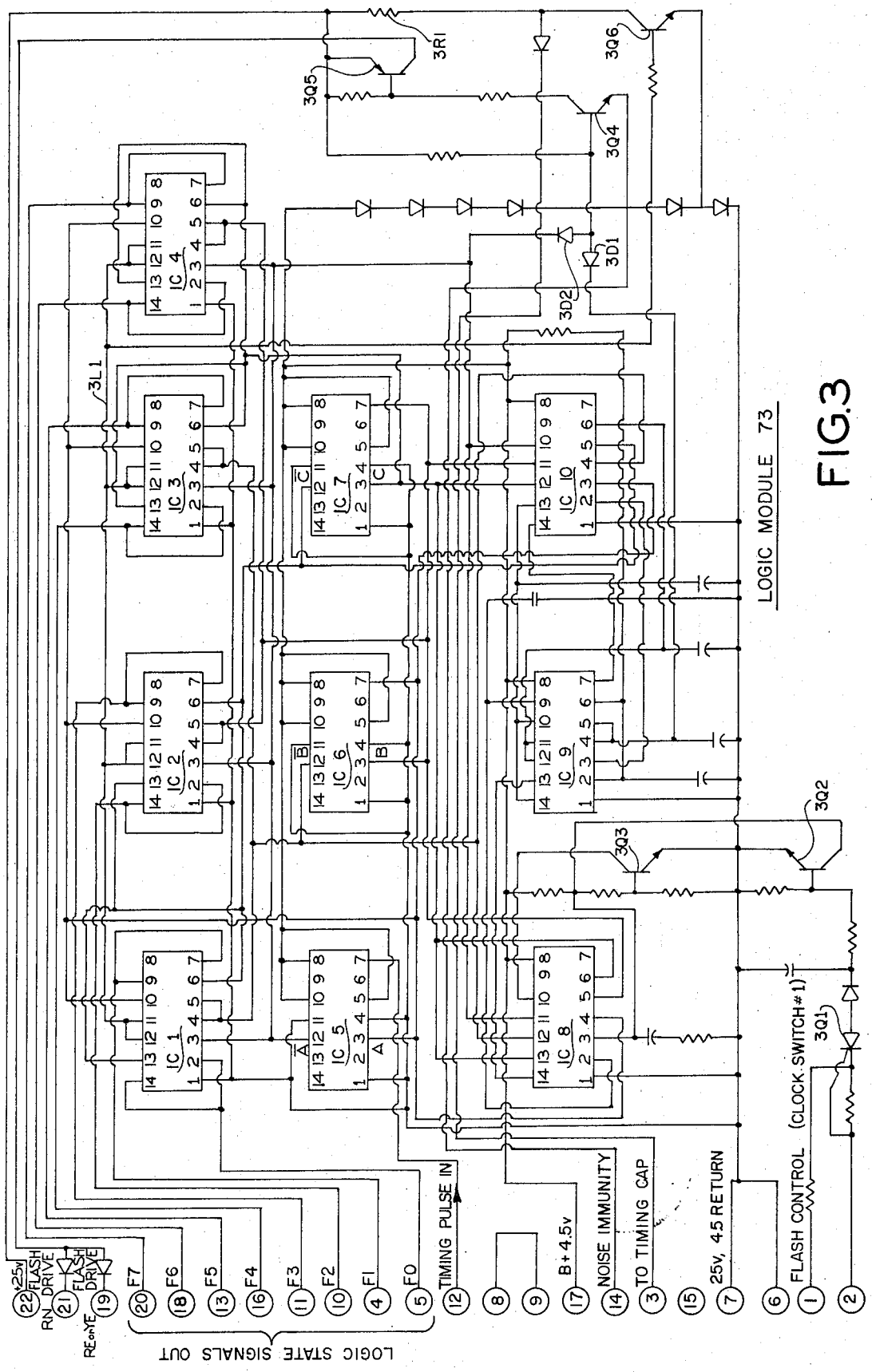
FIG. 3 is a schematic circuit diagram of a control logic module of the FIG. 2 system.
Figure 6:
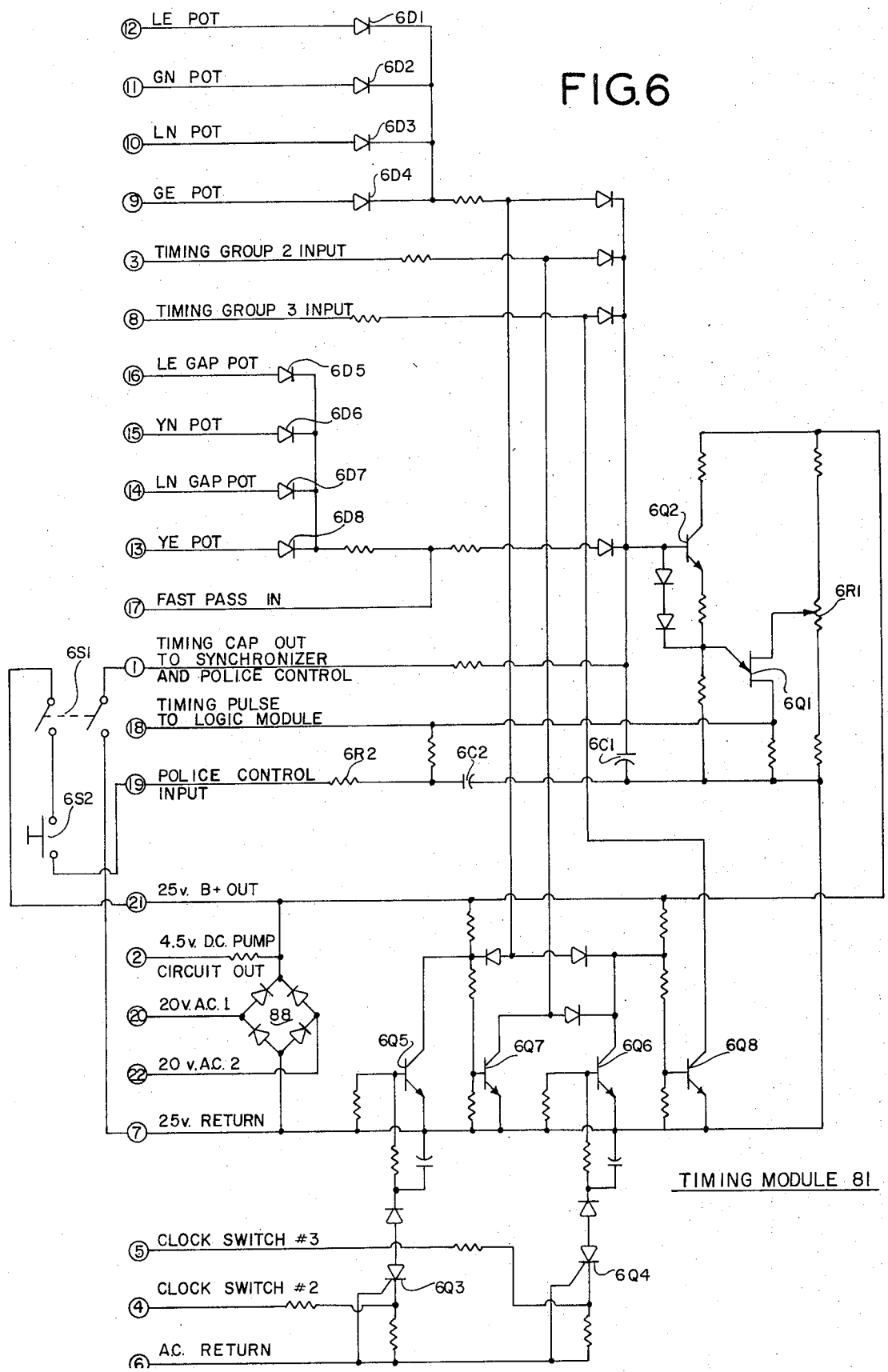
FIG. 6 is a schematic circuit diagram of a function timing module of the FIG. 2 system.

Circuit components of the several modules are similarly designated, such as 3R1, identifying resistor R1 of FIG. 3, and 6C3, identifying capacitor C3 of FIG. 6. Components of FIG. 2 are designated in the same way, such as 2R3, and so forth. However, terminals of jacks and plugs throughout the drawings are designated by characters such as J2 (identifying jack J2) and numerals separated therefrom by a dash and representing the terminal number. For example, jack J2 includes terminals J2-1, J2-2, and so forth. The jack terminal numbers are encircled by the respective terminal symbols.

Power for the system, e.g., 120 v.a.c,. is supplied via a pair of leads 2L1 and 2L2 (lower left corner of FIG. 2) connected from the a.c. hot side and a.c. ground side, respectively, to a pair of respective terminals J4-3 and J4-6 of a jack J4. Jack J4 includes several such terminals and provides the principal means of connecting external circuits to the controller. A noise-filtering capacitor 2C1 is connected externally across leads 2L1 and 2L2. A large (e.g., 30 amperes) main fuse 2F1 is internally connected in lead 2L1. A power connection for the fault logic module 85 is completed from lead 2L1, via terminal J4-3, fuse 2F1, thence to a terminal 10-20 of fault module 85. Another 120 v.a.c. power connection is made through a much smaller (e.g., 1/2 ampere) fuse 2F2 to terminal 10-22. A direct connection is internally completed by module 85 (see FIG. 10) from terminal 10-22 to terminal 10-21. From terminal 10-21, a 120 v.a.c. power circuit is completed through the primary winding of a step-down transformer 2T1 and thence to lead 2L2 via terminal J4-6. The secondary of transformer 2T1 provides reduced voltage (e.g., 20 v.a.c.) to terminals 6-20 and 6-22 of timing module 81. The 120 v.a.c. power is also supplied to terminals 5-14, 5-15, and 5-16 of power module 79 via a blade 2KB1 closed on a contact 2KC1 of a relay 2K1 (whose purpose is explained in connection with fault module 85).

Traffic signal lights are conventionally connected so that one side of the light is grounded and the other side is then adapted to be supplied with conventional 120 v.a.c. power. Thus only one lead is connected to a controller for each light or set of lights which are always to be simultaneously energized (such as lights GE and GW). The signal lights are connected to the present controller by terminals of jack J4. The following table indicates the signal lights and the terminals to which they are connected:

| Signal Light | Terminal |
|---|---|
| GE | J4-1 |
| YE | J4-4 |
| RE | J4-16 |
| LE | J4-23 |
| GN | J4-13 |
| YN | J4-19 |
| RN | J4-15 |
| LN | J4-8 |

As noted, there is concurrent operation of signal lights in opposite directions, i.e., signal light GW is connected in common with light GE, light YS is connected commonly with light YN, and so forth.

b. Control Logic

Referring to FIG. 3, the control logic module 73 includes a plurality of integrated circuits IC1–IC10. Of these, circuits IC1–IC4 are each Quad 2-Input Gate Expander circuits of a commercially available type (Such as Signetics SP631). circuits IC5–IC7 are each JK Binaries, or so-called master-slave flip-flops (such as Signetics SP620). Circuits IC8 and IC10 are each Dual 4-Input NAND gate circuits (such as Signetics SP616) and IC9 is a Quad 2-Input NAND gate circit (such as Signetics SP680).

Figure 12:
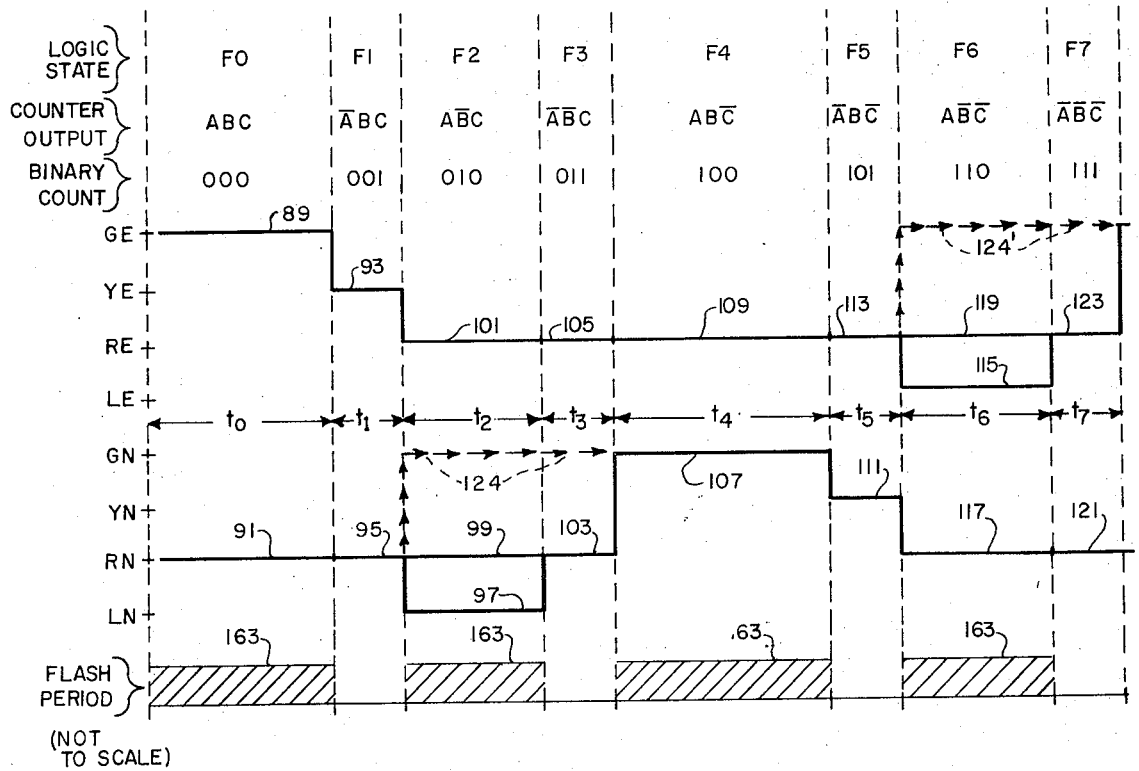
FIG. 12 is a timing diagram useful in explaining operation of the system.

Integrated circuit flip-flops IC5–IC7 are connected together to provide a so-called fall-down binary ripple counter constituting a code generator for generating a repeating coded sequence of logic states. The Q and $\bar{Q}$ (or so-called 0 and 1) outputs of these flip-flops are provided on pins 3 and 12 of each circuit, with pin 7 constituting the toggle or trigger input for each. These flip-flops are connected in serial fashion, each Q output being used to toggle or trigger the successive flip-flop. Terminal 3-12 constitutes the toggle input for the first flip-flop IC5. Since there are three such flip-flops, the Q and $\bar{Q}$ outputs thereof provide a total of $(2)^3$ or eight logic states or functions F0 through F7 each divided by a three-digit binary number. If the respective Q and $\bar{Q}$ outputs of the flip-flops are identified alphabetically according to the order of three flip-flops IC5-7, such as A,$\bar{A}$; B,$\bar{B}$; and C,$\bar{C}$, respectively; then the counter output may be identified by three-digit binary numbers ABC, $\bar{A}$BC, etc., defining binary counts of 000, 001, and so forth. Such logic states, counter output, and binary count are shown in FIG. 12.

Integrated circuits IC1–IC4 together constitute a decoder providing combinational logic for decoding the binary count of the code generator and defining operating periods for signal lights according to the generated coded sequence of logic states. Each of the circuits IC-1–IC4 includes four 2-input gate expanders. These are connected to provide a decoding function familiar to those skilled in the use of such logic devices for decoding the eight logic states and for delivering eight separate logic signals representative of these logic signals in respective terminals 3-4, 3-5, 3-10, 3-11, 3-16, 3-13, 3-18 and 3-20 as the count of the code generator (flip-flops IC5–IC7) is caused to advance successively by timing pulses delivered thereto via terminal 3-12 from timing module 81 in a manner explained below. It is presently sufficient to note that each such timing pulse causes a change in logic state. These pulses are selectively timed to define different signal light operating periods $t_0$–$t_7$ (and shown in FIG. 12) corresponding to the eight logic STATES. While there are eight logic states defined by the states. it will be apparent that a smaller or larger number of logic states may be desired in a controller of this invention.

Certain logic inputs of circuits IC1–IC4 are also commonly connected together by a bus lead 3L1 in order to inhibit decoder output, for purposes explained later, when an inhibit signal is present on lead 3L1.

c. Power Control and Output

Figure 4:
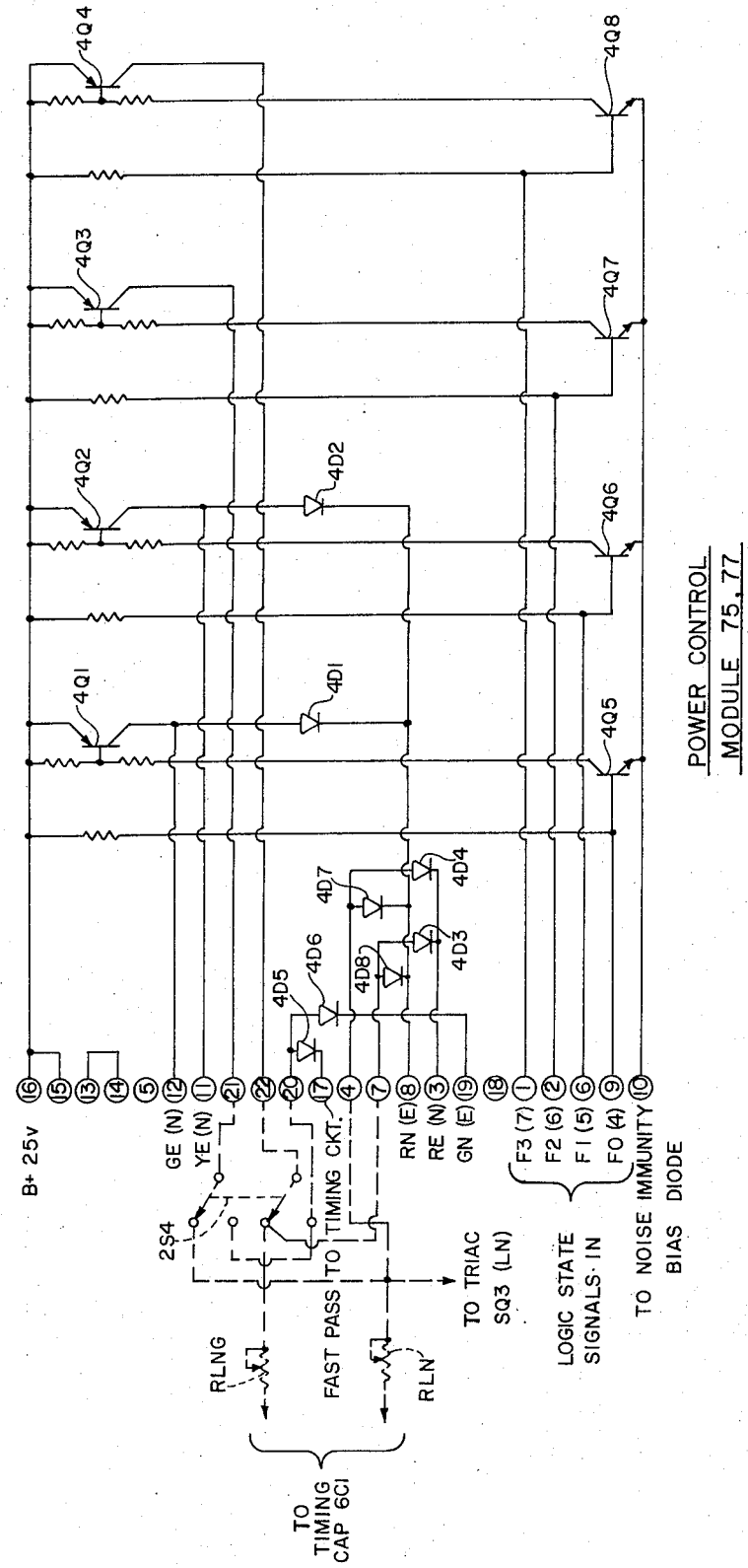
FIG. 4 is a schematic circuit diagram of each of a pair of power control modules of the system of FIG. 2.

Referring for the moment to FIG. 2, the eight logic signals representative of logic states F0–F7 are each adapted to be supplied to one of the two identical power control modules 75 and 77. For example, signals representing states F0–F3 are adapted to be delivered to respective terminals 4-9, 4-6, 4-2, and 4-3 of control module 75. Signals representing states F4–F7 are adapted to be delivered to respective terminals 4-9, 4-6, 4-2 and 4-1 of control module 77. Referring now to FIG. 4, these inputs for the logic state signals are so identified.

Figure 5:
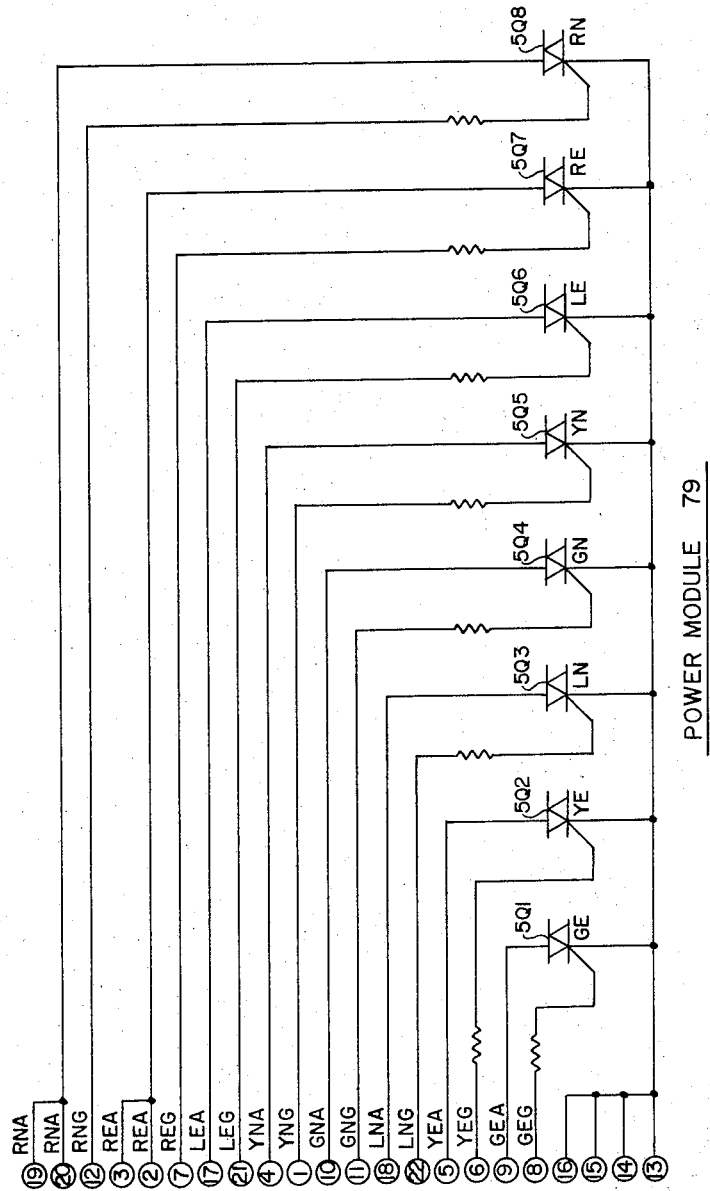
FIG. 5 is a schematic circuit diagram of a power output module of the FIG. 2 system.

Each of modules 75 and 77 includes four PNP transistors 4Q1–4Q4 whose conduction is respectively controlled by four NPN control transistors 4Q5–4Q8, each of the latter transistors having its base connected to a respective one of the four logic state signal input terminals. The emitters of transistors 4Q1–4Q4 of both modules 75 and 77 are each connected to the positive 25 v.d.c. supply via terminal 4-16 and the respective collectors of these transistors 4Q1–4Q4 are connected to terminals 4-12, 4-11, 4-21, and 4-22, respectively, which are in turn connected (see FIG. 2) to corresponding terminals of power module 79 (FIG. 5).

Power module 79 includes eight triacs 5Q1–5Q8 which, as known to those skilled in the electronics arts, are of a family of triggerable semiconductor current switching devices adapted to be triggered and thus rendered conductive by a signal applied to the gate electrode thereof. Each of triacs 5Q1–5Q8 has its gate electrode, or simply gate, connected to one of the two power control modules 75 and 77 for being supplied with triggering current delivered by the collector of one or more of the eight driver transistors 4Q1–4Q4 (there being four such transistors for each power control module). Each of triacs 5Q1–5Q8 is adapted to control the energization of one (or a commonly-connected set) of signal lights 21. The individual signal lights, e.g., GE, YE, etc., controlled by these triacs are identified by reference characters adjacent each triac shown in FIG. 5. Adjacent the terminals of this power module 79 are characters such as RNA, RNG, etc., identifying, according to the signal light color, the triac anodes (to which the signal lights are connected) and the triac gates. I.e., RNA signifies the red-north triac anode, RNG the red-north gate, and so forth.

To understnad the operation of these several power control and power output components, it may first be observed that each of control transistors 4Q5–4Q8 (of each control module 75,77) is adapted to be driven from cut-off to saturation in response to a respective one of the logic state signals delivered by the decoder of logic module 73. Each of the control transistors, when conductive, in turn causes the driver transistors 4Q1–4Q4 to be driven from cut-off to saturation. The relationships between the several logic states and the conduction of transistors 4Q1–4Q8 are shown in the following table:

| Logic state | F0 | F1 | F2 | F3 | F4 | F5 | F6 | F7 |
|---|---|---|---|---|---|---|---|---|
| Control transistor: | | | | | | | | |
| Module 75 | 4Q5 | 4Q6 | 4Q7 | 4Q8 | | | | |
| Module 77 | | | | | 4Q5 | 4Q6 | 4Q7 | 4Q8 |
| Driver transistor: | | | | | | | | |
| Module 75 | 4Q1 | 4Q2 | 4Q3 | 4Q4 | | | | |
| Module 77 | | | | | 4Q1 | 4Q2 | 4Q3 | 4Q4 |

The collectors of transistors 4Q1 and 4Q2 of module 75 and of the same transistors 4Q1 and 4Q2 of module 77 are connected, respectively, to the gates of triacs 5Q1 (GE), 5Q2 (YE), 5Q4 (GN) and 5Q5 (YN), and thus conduction of these individual driver transistors causes triggering of the triac connected thereto, resulting in energization of the corresponding signal light. Diodes 4D1–4D2 of modules 75 and 77 are provided for causing triggering of triacs 5Q8 (RN) and 5Q7 (RE) as a result of the conduction of transistors 4Q1 and 4Q2 and, depending upon the positions of left turn option switches 2S3 and 2S4 (see FIG. 2) whose position is explained later, transistors 4Q3 amd 4Q4. Other diodes 4D3–4D8 of modules 75 and 77 are related to the operation of switches 2S3 and 2S4 and are explained later in conjunction with these switches, whose position controls triggering of triacs 5Q3 (LN) and 5Q6 (LE).

d. Function Timing

Timing of the functions carried out by the present controller is controlled by timing module 81. Referring to FIG. 2, timing pulses for causing the code generator of logic module 73 to change states are supplied by timing module 81 in accordance with operating periods for the individual signal lights which are preset by potentiometers interconnected with module 81. Such timing potentiometers are designated in accordance with the signal light whose operating period is controlled thereby, viz., RGE, RLN, RGN, RLE, RYE, and RYN. Two of these potentiometers, viz., RLNG and RLEG, are for control of timing gaps which are provided between termination of the respective left-north and left-east turn signals and the subsequent initiation of the green-north and green-east signals. The gaps are explained in conjunction with the later explanation of system operation. The timing potentiometers RGE, etc., are connected to the power control modules 75 and 77 for causing circuits of timing module 81 to be responsive to selective energization of the signal lights, as is later apparent. As previously noted, control knobs of these potentiometers are preferably positioned on a face panel of the controller enclosure where they may be adjusted.

Referring now to FIG. 6, a timing circuit for generating the timing pulses includes a unijunction transistor (UJT) 6Q1. A timing capacitor 6C1 is charged at a rate determined by the timing potentiometers, which are effectively connected one-at-a-time to this timing capacitor 6C1 by operation of circuitry of the power control modules 75 and 77. An emitter-follower circuit including transistor 6Q2 having its base connected to timing capacitor 6C1 is connected for causing triggering of transistor 6Q1 when timing capacitor 6C1 is charged to a predetermined voltage dependent upon the firing potential of the UJT. When this predetermined voltge is attained, the UJT fires, delivering a pulse to the code generator of logic module 73 via terminals 6–18.

The emitter-follower arrangement is highly advantageous in providing timing which is uniformly accurate regardless of variations in the so-called peak-point current of the UJT and regardless of variations in temperature as encountered in typical use. The wiper of a timing calibration potentiometer 6R1 is connected to one base of the UJT. Various isolation diodes 6D1–6D8 are connected between the timing capacitor and the respective timing potentiometers.

It may be noted that this timing module 81 includes part of the power supply circuitry of the controller, including a full-wave diode rectifier bridge 88 supplied with a.c. voltage by transformer 2T1. A filter capacitor 2C2 is connected as shown in FIG. 2 across the output leads of bridge 88. Bridge 88 supplies positive 25 v.d.c. potential for not only the UJT and other circuits of module 81, but for circuits of other modules as well.

e. Basic Operation

In order to facilitate an understanding of various other features and circuits of a system of this invention, it is helpful to first understand basic operation of the controller. Referring to FIG. 12, which is a timing diagram, there are illustrated the eight logic states or functions F0–F7 which are generated by logic module 73, together with the binary code generator output state and resulting binary counts which define the respective logic states.

Assuming operation of the controller to begin with logic state F0, the decoder of logic module 73 (FIG. 3) will supply to power control module 75 via terminal 3-5 a signal representing logic state F0. Control transistor 4Q5 (FIG. 4) thus becomes conductive, causing driver transistor 4Q1 to become conductive. Triggering current is then delivered via terminal 4-12 to triac 5Q1 (GE). Thus triggered, triac 5Q1 (FIG. 5) energizes signal light GE (and, of course, GW as noted), whose operation is indicated by segment 89 of FIG. 12. At the same time, conduction of transistor 4Q2 supplies current through diode 4D1 and via terminal 4-8 for triggering of triac 5Q8, thus energizing signal light RN, as shown in FIG. 12 by segment 91. Also at the same time, transistor 4Q1 effectively connects timing potentiometer RGE to the positive 25 v.d.c. supply potential for charging the timing capacitor 6C1 (FIG. 6) through diode 6D4. Potentiometer RGE may be preset to provide a timing interval or operating period $t_0$ to signal light GE of from 5 to 60 seconds, for example. At the end of timing interval $t_0$, capacitor 6C1 has attained a voltage sufficient to trigger the UJT 6Q1 which delivers a timing pulse to logic module 73 for causing toggling of flip-flop IC5. Thus the counter output changes to $\overline{A}BC$, defining a changed logic state F1.

During logic state F1, a signal is delivered to power module 75 by the decoder for causing transistors 4Q6 and 4Q2 instead to become conductive, thereby triggering triac 5Q2 to energize signal light YE, as indicated in FIG. 12 by segment 93. Triggering current is also supplied through diode 4D2 for causing continued triggering of triac 5Q8. Hence signal light RN remains energized as represented by segment 95. During logic state F1, timing potentiometer RYE is effectively connected to the supply potential by transistor 4Q2 for charging the timing capacitor 6C1 at a rate determined by the setting of RYE. The latter potentiometer may provide a timing range of 5 to 10 seconds, for example. In this way, the timing interval, or operating period, $t_1$ for signal light YE is preset by adjustment of potentiometer RYE, just as the operating period $t_0$ for signal light GE is preset by potentiometer RGE. At the end of timing interval $t_1$, the voltage on capacitor 6C1 attains a value which causes triggering of the UJT transistor 6Q1. A timing pulse is thus delivered to the code generator (module 73) for causing change to logic state F2.

Assuming switches 2S3 and 2S4 (FIG. 2) to be in the position shown, during logic state F2 transistors 4Q7 and 4Q3 of module 75 become conductive, triggering triac 5Q3 and thereby energizing signal light LN as depicted by segment 97 of the timing diagram. At the same time, triggering current is supplied through respective diodes 4D7 and 4D4 for triggering of triac 5Q8 (RN) and triac 5Q7 (RE) as indicated by respective timing diagram segments 99 and 101. During logic state F2, the timing capacitor 6C1 is charged through timing potentiometer RLN to provide a preset timing interval $t_2$ constituting an operating period for the concurrently energized signal lights LN, RN and RE of from a few seconds to ten or more seconds, for example. Timing interval $t_2$ is terminated by triggering of UJT 6Q1 and change is thus made from logic state F2 to F3.

Logic state F3 defines a timing gap or interval $t_3$ of a short duration, such as a few seconds, following termination of the left turn signal light (LN) during which gap the red signal lights RN and RE remain energized. This permits traffic to completely clear the intersection prior to initiating the next green traffic signal, as is usually desired. During logic state F3, transistor 4Q4 is driven conductive by conduction of transistor 4Q8 (both of module 75) to effectively connect the left-north gap timing potentiometer RLNG for charging the timing capacitor 6C1. This "pot" is preset to provide the desired gap interval. Triacs 5Q8 (RN) and 5Q7 (RE) are triggered to energize signal lights RN and RE (segments 103 and 105, respectively) during the gap interval $t_3$ by triggering current supplied by transistor 4Q4 through diodes 4D3 and 4D8. After capacitor 6C1 "times out", the UJT generates another timing pulse to initiate logic state F4.

Operation of the controller during logic states F4–F7 is analogous to operation during logic states F0–F3, with the decoder of logic module 73 now supplying respective logic signals representative of logic states F4–F7 to control module 77 rather than to control module 75. These two identical modules are identically wired and the controller accordingly energizes signal lights of the opposite traffic phase during logic states F4–F7 in a manner making the timing diagram effectively symmetrical. However, the operating periods $t_4$–$t_7$ are not necessarily respectively identical with operating periods $t_0$–$t_3$.

Thus, during logic state F4, signal lights GN (segment 107) and RE (segment 109) are energized for an operating period, or timing interval, $t_4$ determined by the setting of potentiometer RGN. During logic state F5, signal light YN is instead energized (segment 111) while signal light RE remains operative (segment 113) during this timing interval $t_5$ of duration preset by potentiometer RYN. During the succeeding logic state F6, signal lights LE (segment 115) and RN (segment 117) are energized for a timing interval $t_6$ determined by potentiometer RLE, while signal light RE (segment 119) remains energized throughout this interval. Finally, during logic state F7, a timing gap, viz., interval $t_7$, is provided for clearing of traffic, as signal lights RE and RN remain energized (segments 121 and 123, respectively). The timing pulse generated by the UJT to terminate logic state F7 begins the timing cycle once more as it initiates state F0 to repeat the sequence of changing logic states.

f. Special Control Features
1. Left Turn Option Control

The controller includes certain special control features, one of which is the turn signal option circuitry 39 noted previously. Referring to FIG. 2, turn signal option control involves the provision of switches 2S3 and 2S4. When switch 2S3 is up (as depicted in FIG. 2) the left turn signal light LE is normally operative. When moved down, switch 2S3 prevents energization of signal light LE. Switch 2S4 similarly functions to control left turn signal light LN. Thus, through operation of these manually actuated switches 2S3 and 2S4 (which are preferably positioned on the controller face panel), system operation may be preselected to provide left turn signal operation for both traffic phases, either phase, or neither phase, as desired.

The interconnection of switches 2S3 and 2S4 with modules 75 and 77 is shown in FIG. 4 where, by dashed line representation, switch 2S4 is shown connected to the left of the module terminals and with timing potentiometers RLN and RLNG. When switch 2S4 is up (as shown), potentiometers RLN and RLNG supply the timing capacitor with charging current from the positive 25 v.d.c. supply as transistors 4Q3 and 4Q4 become respectively conductive. Accordingly, timing of the logic states F2 and F3 defining the left-north signal and left-north gap periods $t_2$ and $t_3$ is controlled by these two potentiometers.

However, when switch 2S4 is instead moved to the lower position, the triggering connection for triac 5Q3 (LN) is broken and thus there can be no energization of signal light LN when transistor 4Q3 becomes conductive. In addition, the lower position of switch 2S4 completes a connection to terminal 4-20 from both terminals 4-21 and 4-22. As a result, as transistors 4Q3 and 4Q4 successively become conductive, current is delivered through 4D5 and through terminal 4-17 as a "fast pass" signal out to the timing circuit and then in on terminal 6-17 of timing module 81 for charging of the timing capacitor 6C1 at a relatively rapid rate. This causes accelerated generation of timing pulses for accelerated changing of the logic state defining an operating period for the turn signal light and also for the logic state defining the subsequent timing gap. Hence, the controller passes quickly through these two logic states (as in a second or two) to prevent an abnormal or erroneous long energization of the red signal lights which would otherwise be normally energized during the left turn and gap periods.

FIG. 12 illustrates the altered timing diagram in response to operation of switches 2S4 and 2S3. If switch 2S4 is operated to preclude energization of the left-north signal light, i.e., light LN, the segments designated 97, 99, and 103 are no longer present and a segment 124 traced by arrows instead represents the signal light energization during logic states F2 and F3. Similarly, a segment 124' represents signal light energization during states F6 and F7 should switch 2S3 be actuated to prevent energization of signal light LE.

2. Police Control

Another special control feature is the previously noted so-called police (or manual) control circuitry 47 (FIG. 1). Referring to FIG. 6, the police control comprises a DPST swtich 6S1 and normally-open pushbutton 6S2 which are preferably enclosed in a small enclosure which can be hand-held and connected by cable to terminals J4-11, -2, -5, and -7 (upper left corner of FIG. 2). These two switches are shown in FIG. 6 to the left of the module terminals as they are connected to terminals 6-1, -19, -21, and -7 of this module. Switch 6S1, which may be a toggle switch, is moved from the position shown to enable police, or manual, operation of the controller. When thus closed, switch 6S1 prevents the timing capacitor 6C1 from charging. Accordingly, the controller remains in the logic state entered prior to closing switch 6S1. When now depressed, pushbutton switch 6S2, in conjunction with a capacitor 6C2 and a resistor 6R2, effectively causes a timing pulse to be delivered from this module via terminal 6-18 to the code generator of module 73. The logic state is thereby changed to effect energization of the next set of signal lights. In this way, a policeman or other person may exercise manual control over operation of the signal lights.

3. Synchronizer

Referring again to FIG. 2, the synchronizer module 83 is an optional part of the present system but constitutes an important further special control feature of this invention which is adapted to alter the timing of changing of the logic states in response to the presence of an externally generated synchronizing signal for the purpose of synchronizing control of the signal lights with operation of controllers at other intersections or with other events occurring externally of the system. In this way, the controller can be slaved to a master controller.

Figure 7:
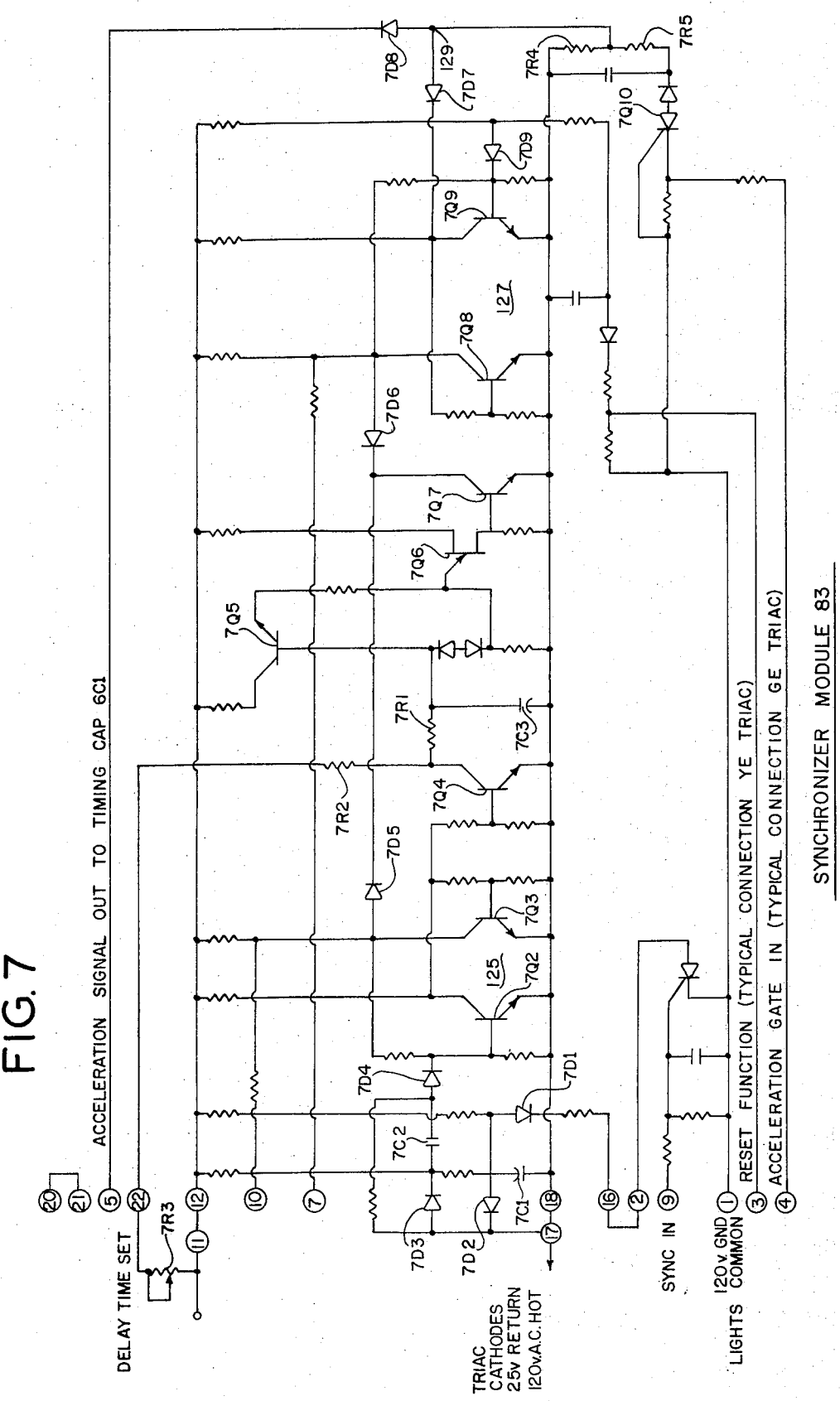
FIG. 7 is a schematic circuit diagram of a synchronization module of the system shown in FIG. 2.

Referring now to FIG. 7, the synchronizer module 83 is provided with the synchronizing (or so-called sync) signal via terminal 7-9 connected with jack terminal J4-14, to which the synchronization, or "sync", line is connected. The sync signal is, as noted, conventionally a.c. line voltage which is usually "on" but which is switched off for a few seconds during the controller's cycle of operation.

Terminal 7-9 is interconnected with the gate of an SCR (silicon controlled rectifier) 7Q1 provided for translating, or effectively stepping down, the a.c. sync signal to a low level d.c. voltage compatible with semiconductor circuitry. Similar SCR's are used to advantage elsewhere throughout the controller circuitry for such voltage translation. The anode of this SCR is connected to a pulse-forming circuit including diodes 7D1 and 7D2 and capacitors 7C1 and 7C2. This circuit includes a silicon unilateral switch, or so-called trigger diode, 7D3 adapted to trigger and deliver a pulse through capacitor 7C2 when the sync signal drops, i.e., is switched off by the master controller to which the present controller is slaved.

The latter pulse is delivered through a diode 7D4 for setting a flip-flop 125. Flip-flop 125 includes a pair of cross-coupled transistors 7Q2 and 7Q3 which, when the flip-flop is set, become respectively conductive and nonconductive. When transistor 7Q3 becomes cut off, its collector goes high to remove base drive from a transistor 7Q4 which is thereby cut off, permitting a timing capacitor 7C3 to charge via resistors 7R1 and 7R2 and a potentiometer 7R3 at a rate determined by the setting of this potentiometer. The purpose of potentiometer 7R3 is to provide means for manually preselecting a time delayed response to the sync signal, as will later be apparent.

To one side of capacitor 7C3 is connected the base of a transistor 7Q5 providing an emitter-follower circuit whose purpose is to improve timing accuracy of a UJT timing circuit over a wide range of ambient temperature analogously to operation of the emitter-follower arrangement of timing module 81. Its emitter is interconnected with the emitter of a UJT 7Q6 adapted to trigger after a time delay interval at a predetermined threshold voltage on capacitor 7C3. The UJT delivers a pulse upon triggering for momentarily causing another transistor 7Q7 to become conductive. When transistor 7Q7 becomes conductive, two things occur: first, flip-flop 125 is reset by current flow through a diode 7D5 causing loss of gate drive for transistor 7Q2; and, second, a further flip-flop 127, comprising cross-coupled transistors 7Q8 and 7Q9, is set by removal of base drive for 7Q8 through a diode 7D6.

As a result of transistor 7Q8 thereby becoming nonconductive (and transistor 7Q9 conductive), the collector of transistor 7Q8 goes high, causing a diode 7D7 to become reverse biased.

Terminal 7-4 is adapted to provide an "acceleration gate" signal input to the synchronizer moudule. Preferably, for this purpose, the anode of the yellow-east triac 5Q2 is interconnected with this terminal (as can be seen in FIG. 2). When triac 5Q2 is triggered, an a.c. line voltage signal is thus delivered via terminal 7-4 to another voltage-translating SCR 7Q10 for causing a d.c. voltage to be delivered by a voltage divider (resistors 7R4 and 7R5) to a junction 129. Consequently, the above-described reverse biasing of diode 7D7 permits this voltage to produce an acceleration signal via terminal 7-5 for causing rapid charging of the timing capacitor 6C1 of timing module 81, with which junction 129 is connected via a diode 7D8. This acceleration signal therefore has the effect of causing the UJT 6Q1 to trigger, producing a timing pulse for changing the logic state.

In essence, the operation of this circuitry is such as to speed up or accelerate the completion of the logic state which is then present when the acceleration signal is delivered by the synchronizer module. The latter logic state is determined by which triac to which is connected terminal 7-4. As noted, this is preferably the green-east triac, i.e., controlling "main street green," since it usually is desired to synchronize controllers along the main thoroughfare. In use, potentiometer 7R3 is set to cause accelerated termination of the green-east signal (occurring during logic state F0) at a time determined by a delay interval following the dropping of the sync signal which will cause traffic to flow smoothly through the intersection. A voltmeter VM (see FIG. 2) or panel light may be interconnected with the sync line, by being plugged into jack J1, to facilitate adjustment of delay potentiometer 7R3 for achieving desired synchronization. Potentiometer 7R3 is also shown connected at jack J1.

It is important to note that the synchronization circuitry is reset, following the acceleration function described above, because of the connection of terminal 7-3 to a triac (such as 5Q2 controlling yellow-east) which is triggered subsequent to that triac providing the acceleration gate. Triggering of the triac whose anode is interconnected with terminal 7-3 causes a signal to be delivered through a diode 7D9 to the base of transistor 7Q7 which thereby becomes conductive to reset flip-flop 127. The synchronizer circuit is then in readiness for another acceleration function.

The synchronization circuitry of this invention is highly advantageous because normal operation of the controller is not prevented should the sync signal disappear entirely (as through breakage of the sync line), fail to be interrupted (as through malfunction of the master controller), become intermittent (as from an intermittent connection), or otherwise become irregular.

If, for example, the sync line should break resulting in total disappearance of the sync singal, the synchronization circuit is normally reset following its usual acceleration function as described above. Since the circuitry is responsive only to periodic dropping of the sync signal, it continues to "wait" for the reappearance of the sync signal and simply permits the signal light operating period which would normally be shortened (to effect synchronization) to continue for its full preset duration. Thus the controller continues to operate in its pretimed mode, the only difference being that the operating period during which acceleration would normally occur is slightly longer than desired for synchronized flow of traffic.

If, as another example, the master controller fails to periodically "drop" or interrupt the sync signal, the last drop in the sync signal will have resulted in one trigger pulse from trigger diode 7D3, causing one setting of flip-flop 125, one delayed triggering of UJT 7Q7, one setting of flip-flop 127, one resulting acceleration signal during the operating period (green-est) in which acceleration normally takes place, and then one normal resetting of the sync circuitry. Thereafter, however, the circuitry will continue to wait for dropping of the sync signal. In the absence of that dropping because of the master controller failure, normal pretimed operation of the controller continues.

If the sync signal becomes random or intermittent, flip-flop 127 may be set as described by a disappearance of the sync signal, but could result only in a possible shortening of the operating period (green-east) during which acceleration would normally occur. Thus, while not achieving synchronized traffic control, operation of the controller is not substantially affected.

Moreover, total failure of the synchronization circuitry will permit normal pre-timed operation of the controller. Accordingly, whether the sync signal or the synchronizer module be at fault, safe operation of the controller continues, thereby providing fail-safe operation.

The controller may be used as a master controller to which other controllers are slaved for synchronizing operation of the latter. Since the triacs of power module 79 (FIG. 5) supply 120 v.a.c. power to the signal lights, one such triac, such as one of those for energizing red signal lights RN or RE, may be used to supply the 120 v.a.c. synchronizing signal. Thus, the sync signal will be present when the signal lights controlled thereby are deenergized.

g. Flasher Mode Control

A conventional clock switch as depicted schematically at 53 in FIG. 2 may be connected with the system for causing ordinary traffic control operation of the controller to be terminated and a flasher mode of operation to instead be initiated. During this flasher mode of operation, the red signal lights RN of the north-south traffic phase are periodically energized to provide flashing operation and either the red or the yellow signal lights (RE or YE) of the opposite east-west traffic phase are similarly energized for flashing operation, according to the position of a switch 2S2 (center of FIG. 2).

Switch 2S2, preferably positioned on the controller face panel, is moved to the right as shown to select RE flasher operation and to the left to select YE flasher operation. Since the north-south phase is defined as the side street and the east-west phase as the main street, it is seen that, during flasher operation, the side street traffic is always provided with red flasher operation while the main street signal lights may be manually preselected to provide either red or yellow flasher operation. This is advantageous since, by this means, concurrent yellow flasher operation of opposite or intersecting traffic phases, a dangerous control possibility, is precluded. This "internal" flasher flashes both on the main and side streets simultaneously while an "external"

flasher (which the system operates in response to a fault, as described later) flashes on such streets alternately, thereby providing an additional signal to the servicing crew as to malfunction.

Conventional clock switch 53, which is of the type adapted to provide or switch on 120 v.a.c. power for a preset time interval beginning at a particular time of day, may be connected to provide such power at terminal 4-12 (upper left of FIG. 2) to cause termination of the usual traffic control operation and initiation of flasher operation beginning with the switching on of this 120 v.a.c. power. Terminal J4-12 is interconnected with terminal 3-1 of logic module 73. Referring to FIG. 3, terminal 3-1 (which is labeled "flash control (clock switch No. 1)) is interconnected with a voltage-translating SCR 3Q1. When the flasher mode initiating voltage, i.e., flash control signal, is delivered to terminal 3-1, this SCR causes a transistor 3Q2 to become conductive, providing a logic inversion function. The collector of 3Q2 is interconnected with the base of a further transistor 3Q3 (which serves a logic inversion function) and with integrated circuit IC8, to which transistor 3Q3's collector is also connected.

Integrated circuits IC8–10 together comprise flasher logic means for permitting initiation of flasher operation only during a predetermined one of the logic states F0–F8 and for permitting reversion to the ordinary traffic control mode of operation during a predetermined one of the logic states. Such flasher logic permits transition between the flasher and traffic control modes only during safe traffic conditions. A schematic diagram of this logic circuitry is shown in FIG. 9 and illustrates pin numbers of circuits IC8–IC10 which correspond identically with those of commercially available types of respective logic circuits mentioned previously with regard to FIG. 3.

Figure 9:
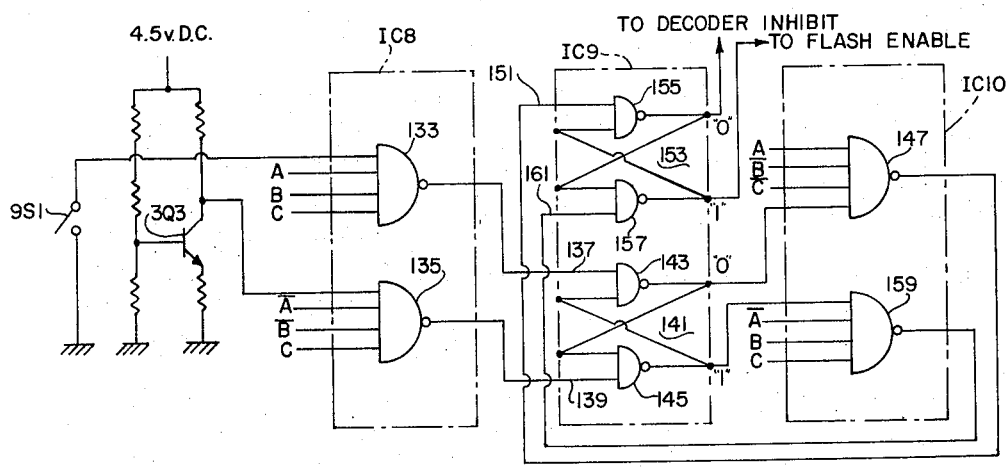
FIG. 9 is a detailed schematic diagram of certain logic circuitry of the FIG. 3 logic module and which controls entry and exit of a flasher mode of operation.

Referring to FIG. 9, a switch 9S1, one side of which is grounded, is shown to represent the function of transistor 3Q2 and may be regarded as being closed when the 120 v.a.c. flash control signal is supplied by the clock switch 53 (transistor 3Q2 being conductive in such event). Transistor 3Q3 is shown in FIG. 9 as connected for being controlled by switch 9S1. The other side of switch 9S1 and the collector of 3Q3 are each connected to one input, respectively, of two four-input logic NAND gates 133 and 135. The other three inputs of each such NAND gate are connected to appropriate code generator (IC5-7) outputs, viz., A B C and $\overline{A}$ $\overline{B}$ C, as indicated.

The respective outputs of NAND gates 133 and 135 are connected to the reset input 137 and set input 139 of an RS flip-flop 141 constituted by a pair of cross-coupled two-input NAND gates 143 and 145 of circuit IC9. Flip-flop 141 is adapted to be set when the output of gate 135 is high (while the output of gate 133 is low) and to be reset when the output of gate 133 is high (while the output of gate 135 is low).

The 0 output of flip-flop 141 is connected to one input of a four-input logic NAND gate 147 of circuit IC10. The other three inputs of gate 147 are connected to appropriate code generator outputs, viz., A $\overline{B}$ $\overline{C}$, while the output of gate 149 is interconnected with the reset input 151 of an RS flip-flop 153 constituted by the two remaining two-input NAND gates 155 and 157 of circuit IC9.

The 1 output of flip-flop 141 is connected to one input of the other four-input logic NAND gate 159 of circuit IC10, the other three inputs being connected to appropriate code generator outputs, viz., $\overline{A}$ B C. The output of gate 159 is interconnected with the set input 161 of flip-flop 153.

Flip-flop 153 operates such that, when set, this flip-flop 0 output, which is connected (see FIG. 3) to decoder circuits IC1–IC4 causes logic state output signals from the decoder to be inhibited, while the 1 output is interconnected with certain "flash enable" circuits of this logic module 73 to cause continuous charging of the module 81 timing capacitor 6C1 at a relatively high current for causing repetitive triggering of the UJT 6Q1.

These flash enable circuits comprise a transister 3Q4 whose band is connected through a diode 3D1 to the 1 output of flip-flop 1S3 and through a diode 3D2 to the $\overline{Q}$ output of the first flip-flop circuit IC5, i.e., to the flip-flop $\overline{A}$ output. Transistor 3Q4 controls the condition of a driver transistor 3Q5 whose collector supplies flash drive, i.e., triac triggering current, to module 79 during the flash mode via diodes 3D3 and 3D4 and terminals 3-21 and 3-19. The adjacent transistor 3Q6 is interconnected with the 0 output of flip-flop 153 and become cut-off when this flip-flop is set cause the continuous charging of timing capacitor 6C1 via terminal 3-3 at a rate determined by a resistor 3R1.

Operation of these flasher control circuits is as follows. When the clock switch supplies the 120 v.a.c. flash control signal to terminal 3-1, normal traffic control operation continues until logic state F3 is reached. At that time, the code generator outputs $\overline{A}$ $\overline{B}$ C cause NAND gate 135 to set flip-flop 141. The code generator continues to generate logic states with continued controller operation until logic state F1 is reached, at which time the code generator outputs $\overline{A}$ B C, to which the NAND gate 159 inputs are connected, cause gate 159 to set flip-flop 153. As explained, this causes inhibition of decoder operation and enabling of the flasher mode. More specifically, transistor 3Q6 becomes cut-off to cause continuous rapid charging of timing capacitor 6C1 via terminal 6-1 of the timing module 81. The effect of such rapid charging is to cause the UJT 6Q1 to generate relatively rapid pulses, e.g., at about one-half second (or shorter) intervals. At the same time, the 1 output of flip-flop 153 reverse biases diode 3D1 to enable transistor 3Q4 to be driven conductive by the $\overline{A}$ output from circuit IC5. This $\overline{A}$ output becomes high each time the circuit IC5 flip-flop is toggled, as occurs each time the UJT 6Q1 generates a pulse at the now rapid rate.

Each time transistor 3Q4 becomes conductive, transistor 3Q5 also becomes conductive to deliver triggering current to the red-north triac 5Q8 and to either the yellow-east triac 5Q2 or red-east triac 5Q7, depending upon the position of flash control switch 2S2. This has the effect of causing flashing operation of the signal light RN (and commonly connected lights) and either signal light YE or RE (as well as commonly connected lights). Energization of other signal lights is prevented by virtue of the inhibiting of the decoder's logic state output signals.

It may be observed that the exact moment of initiating flasher operation occurs during safe traffic conditions. I.e., flashing begins with logic state F1 because of the code generator outputs $\overline{A}$ B C which cause NAND gate 159 to set flip-flop 153. Change from traffic control mode to flashing mode at this instant minimizes the possiblity that a driver may misinterpret the change in signal or attempt to "beat the light" and so collide with an automobile properly entering the controlled intersection. Of course, it might be desired to enter the flashing mode at the beginning of some other logic state. If so, the code generator outputs defining such logic state would be interconnected with inputs of NAND gate 159. It should be noted that, during the flasher mode of operation, the code generator (IC-5–IC7) continues to generate the successive logic states in repeating sequence, but at the increased rate caused by the faster timing pulse from timing module 81. When flashing, periods during which signal lights are energized are designated at 163 in FIG. 12, each such period being of equal duration, of course.

"Exiting" the flasher mode, i.e., return to the traffic control mode of control is caused by termination by clock switch 53 of the flash control signal at terminal 4-1. When that occurs, flasher operation continues until the code generator produces outputs A B C defining logic state F0. At that instant, NAND gate 133 causes resetting of flip-flop 141. The logic states continue to change until logic state F6 is attained. NAND gate 147 effectively decodes that logic state (defined by code generator outputs A $\bar{B}$ $\bar{C}$) to reset flip-flop 153. When that occurs, inhibiting of the decoder ceases, transistor 3Q6 becomes conductive to prevent further fast charging of capacitor 6C1, and flasher operation is no longer enabled since diode 3D1 is permitted to become forward biased. Thus, ordinary traffic control operation is then resumed. This transition from flasher to traffic control operation takes place at a moment providing a safe traffic condition, the signal lights resuming operation in a logical, orderly and unconfusing manner. Of course, exiting of the flasher mode can occur at the initiation of other logic states that F6, by connecting code generator outputs toher than $\bar{A}$ $\bar{B}$ C to inputs of NAND gate 147. Similarly, code generator inputs other than shown can be interconnected with gates 133 and 135, if desired, it being important to provide operation which causes smooth, logical entering or leaving the flasher mode in a step-wise manner as the controller steps through the logic states.

h. Optional Timing

Figure 8:
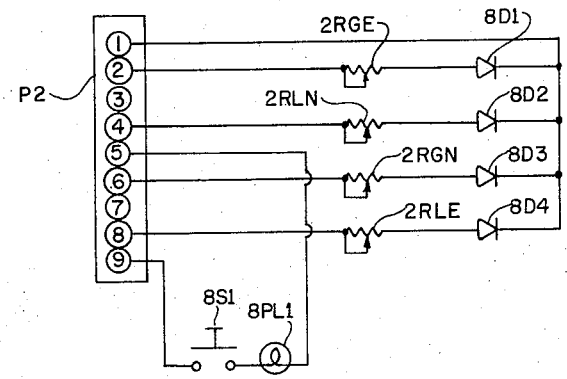
FIG. 8 is a schematic circuit diagram of an auxiliary time group module for use with the FIG. 2 system.

A controller of this invention may optionally have one or two auxiliary "timing groups" connected with it for causing up to two different sets of signal light operating periods to take effect at times predetermined by clock switch 53. Thus, signal light operating periods can automatically be changed, as during rush hours, to suit traffic. For this purpose, timing module 81 (FIG. 6) includes a pair of terminals 6-4 and 6-5 to either of which clock switch 53 can provide 120 v.a.c. potential at predetermined times to cause one or the other auxiliary timing group to take control priority over certain ones of the main timing potentiometers. For this purpose, clock switch 53 can be connected at terminals J4-21 and J4-17, respectively (upper left corner of FIG. 2). Circuitry of such an auxiliary timing group ("timing group 2") is shown in FIG. 8. A plug P2 of the timing group is adapted to be plugged into jack J2 (FIG. 2). An identical circuit ("timing group 3") can be plugged into jack J3.

This timing group circuit includes four auxiliary timing potentiometers 2RGE, 2RLN, 2RGN and 2RLE which take operational priority over timing potentiometers RGE, RLN, RGN and RLE, respectively, if the timing group is made operative by clock switch 53.

The other main timing potentiometers, viz., RLEG, RYE, RLNG, and RYN continue to function as before regardless of operation of a timing group. FIG. 2 illustrates that one side of each of these auxiliary timing potentiometers is connected to a respective one of the output terminals of modules 75 and 77 as is true of main timing potentiometers RLE, RGN, RLN and RGE. The other side of each auxiliary potentiometer is connected through a respective isolation diode 8D1–8D4 in common to terminal P2-1, which is adapted to interconnect via terminal J2-1 with terminal 6-3 (designated "timing group 2 input") of timing module 81. Auxiliary potentiometers of "timing group 3" adapted to be connected by plugging into jack J3 are commonly connected to a similar terminal 6-8 (with the legend "timing group 3 input") of module 81. A pushbutton 8S1 and pilot lamp 8PL1 (both of which may be located on a face panel of an enclosure for the timing group) allow a person adjusting the system, etc., to determine if the auxiliary timing group is operative. If so, pilot lamp 8PL1 becomes energized when pushbutton 8S1 is depressed. Each timing group includes such a lamp and pushbutton.

Referring now to FIG. 6, respective voltage-translating SCR's 6Q3 and 6Q4 are interconnected with terminals 6-4 and 6-5. Respective transistors 6Q5 and 6Q6 have their bases interconnected with these SCR's. Transistor 6Q5 becomes conductive when 120 v.a.c. potential is supplied to terminal (6-4 to cause a normally conductive transistor 6Q7 to become cut-off. Similarly, transistor 6Q6 conducts when 120 v.a.c. potential is supplied to terminal (6-5 to cause a normally conductive transistor 6Q8 to become cut-off. When conductive, transistor 6Q7 clamps the timing group 2 input terminal 6-3 to ground, while transistor 6Q8, when conductive, similarly clamps the timing group 3 input terminal 6-8 to ground. Thus 6Q7 and 6Q8 normally prevent the time group circuits plugged in at respective jacks J2 and J3 from affecting the operation of timing module 81.

However, 120 v.a.c. potential on terminal 6-4 cuts off transistor 6Q7 to permit charging of timing capacitor 6C1 by the auxiliary timing potentiometers of timing group 2 (i.e., that timing group plugged into jack J2) via terminal 6-3. At the same time, the conduction of transistor 6Q5 effectively clamps to ground the four inputs (terminals 6-12, -11, -10, and -9) from main potentiometers RLE, RGN, RLN, and RGE. Accordingly, as the logic states are changed to cause voltage to be supplied by power control modules 75 and 77 to different ones of the auxiliary timing potentiometers, capacitor 6C1 charges at a rate determined by these auxiliary potentiometers. In this way, the operating periods of signal lights LE, GN, LN and GE are determined by the auxiliary timing group (timing group 2) so long as 120 v.a.c. potential is supplied by clock switch 53 to terminal 6-4.

If now this 120 v.a.c. is supplied by clock switch 53 to terminal 6-5, transistor 6Q6 will become conductive to charge these four main potentiometer inputs to ground the transitor 6Q8 will be cut-off to permit charging of timing capacitor 6C1 at rates determined by the auxiliary timing potentiometers of time group 3. Transistor 6Q6 effectively overrides transistor 6Q7 since conduction of the former clamps the time group 2 input (terminal 6-3) regardless of whether terminal 6-4 remains energized. Of course, when terminal 6-4 and 6-5 are deenergized, timing is once more solely under control of the main timing potentiometers.

It may be observed that calibration or adjustment of the system, as through adjustment of the several main timing and auxiliary timing potentiometers, is greatly facilitated by simply observing the test lights 63 (located preferably on the controller face panel). Referring to FIG. 2, test lights 63 are made operative by closing a switch 2S1 connecting one side of each to power lead 2L2, i.e., to the a.c. ground. Such test lights eliminate time-consuming and difficult personal observation of individual ones of signal lights 21.

i. Fault Monitoring Means

Fault logic module 85 (FIG. 10) includes circuitry comprising the fault monitoring means designated 65 in FIG. 1, while relay 2K1 effectively constitutes the a.c. power switching circuit 69 of FIG. 1 which is controlled by circuitry of module 85.

Referring to FIG. 10, terminals 10-13, 10-15 and 10-17 constitute the inputs of a three-input RTL (resistor-transistor logic) OR gate comprising resistors 10R1, 10R2 and 10R3, and a transistor 10Q1. A fourth terminal 10-12 is not connected but permits expansion of the OR gate to provide a fourth input if desired. Terminals 10-13, -15 and -17 are connected respectively to terminals 5-10, -14 and -18 of the power module 79 (see FIG. 2) and thus these three terminals of fault module 85 are provided with the respective power output voltages which cause energization of signal lights GN, YN and LN (as suggested by legends in FIG. 10).

Similarly, terminals 10-5, 10-7 and 10-9 are the inputs of another RTL OR gate including resistors 10R4–10R6 and a transistor 10Q2 and the latter terminal are interconnected with power module 79 to be provided with the output voltages causing energization of signal lights LE, YE and GE, as indicated. Terminal 10-11 is unconnected but can be, if desired, to expand this second OR gate. Transistor 10Q2 is thus connected for being driven into condition if one of signal lights LE, YE or GE is energized, while transistor 10Q1 becomes conductive in response to energization of any one of signal lights GN, YN or LN. The power circuit, including triac 5Q4 for energizing signal light GN is shown in dashed line, to illustrate its interconnection with fault module 85.

It should be observed that concurrent energization of any one of signal lights GN, YN and LN with any one of signal lights LE, YE and GE is deemed a dangerous condition because the presence of such simultaneous signals would permit conflicting traffic within the intersection: i.e., for the sake of safety, there should not be, for example, a green-north signal concurrently with a green-east signal, and so forth. The expander terminals 10-12 and 10-11 allow other signal lights (as in specialized control applications) to be connected, in effect, where the concurrent energization of lights interconnected with these two terminals would be inconsistent with safety.

To provide means for detecting such unsafe concurrent energization of respective signal lights (which are seen to those controlling intersecting phases of traffic), transistors 10Q1 and 10Q2 are connected for controlling the conduction of a transistor 10Q3. The latter is normally conductive but becomes nonconductive only if both transistor 10Q1 and 10Q2 become conductive and thus, in effect, provides a logic AND gate function. If nonconductive, transistor 10Q3 permits charging of a capacitor 10C1 through resistors 10R7 and 10R8.

If transistor 10Q3 remains nonconductive for a sufficient time period, the continued charging of capacitor 10C1 will build up a voltage of a level sufficient to cause triggering of an SCR 10Q4 whose anode is interconnected via terminal 10-18 with one side of the winding of relay 2K1. When thus triggered, this SCR energizes the relay winding, thereby transferring the several blades 2KB1, 2KB2 and 2KB3 of relay 2K1 from the position shown in FIG. 2. When blade 2KB1 thus opens from contact 2KC1 and closes on a contact 2KC2, a latching circuit is completed from the a.c. hot lead 2L1 via terminal 10-20 and through a diode 10D1 and resistor 10R9 for causing continued triggering of SCR 10Q4. Hence the relay 2K1 winding remains energized until reset by opening the main power leads 2L1 and 2L2, by operation of a main power switch (not shown). Capacitors 10C2 and 10C3 provide noise immunity to prevent erroneous triggering of the SCR.

When blade 2KB1 opens from contact 2KC1, power for all of the several modules except fault logic module 85 is interrupted. In this way, traffic control operation of the system is terminated by fault module 85 and relay 2K1 in response to energization of an unsafe combination of the signal lights.

Observing that blade 2KB2 is normally closed on a contact 2KC3 to complete the circuit from the anode of triac 5Q8 (RN) to signal light RN and that blade 2KB3 is normally closed on a contact 2KC4 to complete the anode of triac 5Q7 (RE) to signal light RE, it may be seen that, upon energization of the winding of relay 2K1 causing transfer of blades 2KB2 and 2KB3, the normal energization circuits for signal lights RN and RE are opened, and these lights are instead connected (by closure of these two blades on respective contacts 2KC5 and 2KC6) to respective terminals J4-20 and J4-16.

Preferably plugged into terminals J4-20 and J4-16 is a conventional electromechanical or electronic flasher of the type typically used with traffic controllers. Such a flasher is preferably separate from the controller to permit control of the intersection solely by the flasher, such as prior to installation of the controller per se, or during repairs requiring shutting down or removal of the controller. Hence, the transfer of blades 2KB2 and 2KB3 resulting from energization of the relay winding causes the flasher to operate the red signal lights RN and RE. In this way, no dangerous traffic condition is permitted to develop through a fault of the controller. Moreover, this flashing operation of signal lights in response to detection of a concurrent energization of an unsafe combination of signal lights will serve to indicate to police or maintenance personnel that the controller has failed. It will be appreciated that relay 2K1, while electromechanical in nature, does not degrade normal reliability of the system, since it is operated only in response to a fault.

Figure 11:
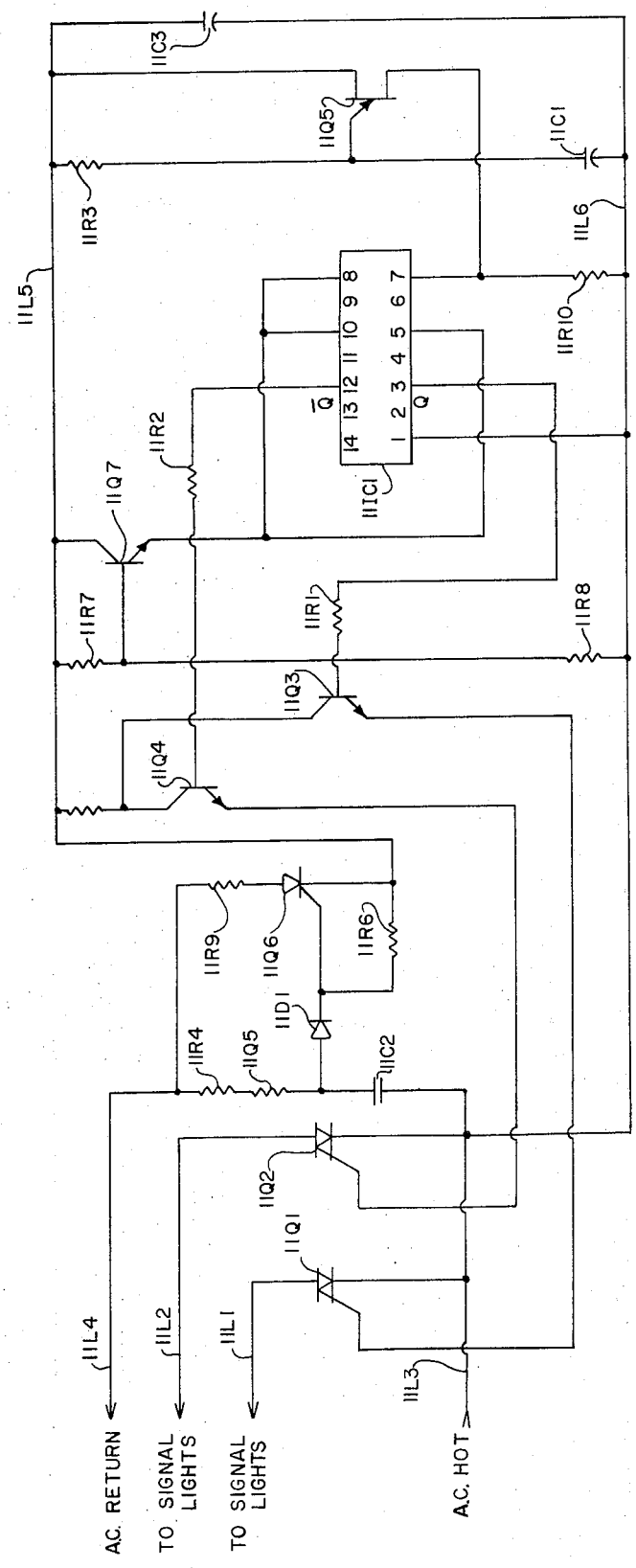
FIG. 11 is a schematic circuit diagram of a flasher control module which can be used with the FIG. 2 system.

A novel flasher circuit to be utilized as just described with the present controller is shown in FIG. 11. This flasher circuit includes a pair of triacs 11Q1 and 11Q2 whose anodes may be connected by respective leads 11L1 and 11L2 to two sets of signal lights (such as lights LE and LN) which are to be operated in a flashing mode. Other leads 11L3 and 11L4 permit connection to the conventional line service a.c. hot and a.c. ground, respectively.

Triggering of triacs 11Q1 and 11Q2 is controlled by respective driver transistors 11Q3 and 11Q4 whose emitters are, for that purpose, connected to the triggering, or gate, electrodes of the triacs. The bases of these transistors are connected through current-limiting resistor 11R1 and 11R2, respectively, to the Q and $\bar{Q}$ outputs of an integrated circuit binary, or toggle flip-flop, 11IC1. This circuit may be the commercially available Signetics Model SP620A and pin numbers correspond to that model. The toggle input (pin 7) of this flip-flop 11IC1 is interconnected with one base of a unijunction transistor (UJT) 11Q5 connected as an oscillator or timer. The UJT triggers respectively to provide pulses for periodic toggling of the flip-flop at a rate determined by a capacitor 11C1 and a resistor 11R3 which controls the rate of charging of this capacitor. These pulses are developed across a load resistor 11R10.

Transistors 11Q3, 11Q4 and 11Q5 are provided with a suitable positive supply voltage, such as 15 v.d.c., on a lead 11L5 with respect to a circuit ground lead 11L6, by a simple power supply circuit including an SCR 11Q6 interconnected with the a.c. supply leads 11L1 and 11L2. Triggering of this SCR, whose anode is connected in series with a load resistor 11R9, is controlled by a triggering circuit including resistors 11R4-11R6, a diode 11D1, and a capacitor 11C2 such that triggering of the SCR occurs during alternate half-cycles of the a.c. supply voltage at a firing angle causing a peak voltage of about 15 v.d.c. to be delivered to lead 11L5. A relatively large filter capacitor 11C3 is thereby charged to this voltage.

Reduced voltage, e.g., 4.5 v.d.c, for the integrated circuit 11IC1 is provided by a transistor 11Q7 whose base is connected to the junction of a pair of resistors 11R7 and 11R8 forming a voltage divider between leads 11L5 and 11L6.

In operation of this flasher circuit, toggling of the flip-flop circuit 11IC1 causes triacs 11Q1 and 11Q2 to be triggered alternately (such alternate triggering being advantageous in that inrush and total current demand is reduced from that required to concurrently energize all signal lights during a flashing mode of operation). Accordingly, there results flashing operation of signal lights to which leads 11L1 and 11L2 are connected at a rate determined by the value of resistor 11R3. The leads 11L1-11L4 of this flasher unit may be plugged suitably into jack J4 at the terminals J4-10, -15, -16, and -20 thereof as described above.

General Considerations

While the present systems as specifically described is seen to be of the pre-timed, multiphase type which can be line-synchronized, it should be observed that a controller embodying principles of this invention can be constructed to provide simpler control functions, such as for single phase control (as at a between-intersection pedestrian crossing installation), or one and one-half phase control, and so forth.

Similarly, the system principles suggest the construction of controllers for more involved traffic control applications as well, e.g., to control additional traffic phases or walk-wait signals, etc., noting that the number of logic states which are defined by the code generator can be varied to suit requirements for additional control functions, there then being such additional power control and power output circuits as are needed. Further, the sequence in which signal lights are energized can be changed if desired, as where it is required that a left turn signal follow rather than precede a green signal, as is sometimes preferred.

The controller has been described as being nonactuated, i.e., one whose operation is unaffected by the presence of traffic and which has no traffic detectors for that purpose. However, such detectors may be utilized in conjunction with a controller constructed according to the invention so as to provide either a semi-actuated system, wherein some but not all of the controlled traffic phases are provided with traffic detectors (such as conventional loop detectors or pressure switch detectors), or a fully-actuated system, wherein all phases are controlled by detectors in accordance with the presence of traffic. Such detectors can, for these purposes, be used either to bypass operation of particular signal lights (such as the side street green signals) in response to the absence of side street traffic or to extend operation of other signal lights (such as main street signals) in response to heavy main street traffic, et cetera.

Generally speaking, the controller is thus seen to be flexibly and readily used for control of a wide range of control applications with controls being easily adjusted and options being readily added or removed, as is desired, to achieve a change in system capability. Moreover, the modular construction has the additional advantage of facilitating repairs or the like by permitting simple removal and replacement of circuit modules.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A solid state electronic traffic signal local controller for controlling a plurality of traffic signal lights, comprising: logic means for providing a sequence of timed changing logic states which define operating periods for said signal lights; control means responsive to said changing logic states for selectively energizing predetermined ones of said signal lights during each of respective operating periods defined by said logic states; timing means operative to generate timing pulses for causing successive changing of said logic states; means for adjusting the timing of generation of said timing pulses thereby to preselect the length of the respective operating period defined by each of said logic states; and means for causing accelerated generation of a timing pulse by the timing means in order to shorten the operating period defined by at least one of said logic states in response to the presence of an externally generated master controller synchronizing signal, thereby to synchronize control of said signal lights with the master controller.

2. A traffic signal controller as set forth in claim 1 wherein said synchronizing means includes delay means for manually preselecting a time delayed response to said master controller synchronizing signal.

3. A traffic signal controller as set forth in claim 1 wherein said synchronizing means comprises further logic means for preventing said altering of the timing of changing logic states if the presence of said synchronizing signal is irregular thereby to preclude improper synchronizing of said signal lights.

4. A solid state electronic traffic signal local controller for multiphase control of a plurality of traffic signal lights at a traffic intersection, comprising: logic means including a code generator for generating a repeating coded sequence of timed logic states and a decoder for defining operating periods for said signal lights according to said coded sequence; control means including a plurality of semiconductor current switching devices operative in response to said decoder for selectively energizing predetermined ones of said signal lights during each of respective operating periods defined by said logic states; timing means responsive to selective energization of said signal lights and operative to generate timing pulses for causing said code generator to generate successive logic states; means for manually varying the timing of generation of said timing pulses thereby to preselect the length of the respective operating period defined by each of said logic states; flasher control means; and fault monitoring means for terminating traffic control operation of said controller in response to concurrent energization of an unsafe combination of said signal lights in different phases permitting conflicting traffic within said intersection, said fault monitoring means operating upon said unsafe combination to disconnect said controller from a source of power therefor and concomitantly to connect said flasher control means to predetermined ones of said signal lights.

5. A traffic signal controller as set forth in claim 4 wherein at least one of said logic states defines an operating period for at least one signal light signalling a turn for traffic, said system further comprising means for manually preselecting system operation to prevent energization of said turn signal light.

6. A traffic signal controller as set forth in claim 5 further comprising means operative when energization of said turn signal light is prevented to accelerate the generation of a timing pulse for causing accelerated changing of the logic state defining an operating period for said turn signal light, said accelerated changing of the logic state preventing erroneously long operation of signal lights normally operated with said left turn signal light.

7. A traffic signal controller as set forth in claim 4 wherein said fault monitoring means comprises fault logic circuitry for detecting concurrent energization of predetermined respective signal lights controlling intersecting traffic.

8. A traffic signal controller as set forth in claim 7 wherein said fault monitoring means further comprises means for causing flasher operation of red signal lights in response to detection of said concurrent energization.

9. A traffic signal controller as set forth in claim 8 further comprising flasher means for providing said flasher operation of signal lights, said flasher means comprises at least one triggerable semiconductor current switching device operable, when triggered, to energize signal lights, and timing means for causing periodic triggering of said switching device thereby to cause said flashing energization of signal lights.

10. A traffic signal controller as set forth in claim 9 wherein said flasher means comprises a pair of triggerable semiconductor current switching devices each operable, when triggered, to energize ones of said signal lights, a flip-flop having a pair of outputs each connected for causing triggering of a respective one of said switching devices, and a timing circuit operative to provide pulses for causing periodic toggling of said flip-flop, thereby to cause alternate triggering of said switching devices for causing said flashing energization of signal lights.

11. A traffic signal controller as set forth in claim 4 wherein said means for manually varying timing includes a first plurality of manually variable impedance devices interconnected with said control means and further comprising auxiliary means for manually varying the timing of generation of said timing pulses, said auxiliary means including a second plurality of manually variable impedance devices interconnected with said control means, and switching means for causing said first plurality of devices to become inoperative and said second plurality of devices to become operative in response to said operation of a clock switch.

12. A traffic signal controller as set forth in claim 11 further comprising a plurality of indicator lights adapted to be energized concomitantly with respective ones of said signal lights, said indicator lights being positioned for all being viewed simultaneously thereby to facilitate adjustment and testing of said system.

13. A solid state electronic traffic signal local controller for controlling a plurality of traffic signal lights, comprising: logic means for providing a sequence of timed changing logic states which define operating periods for said signal lights; control means responsive to said changing logic states for selectively energizing predetermined ones of said signal lights during each of respective operating periods defined by said logic states; timing means operative to generate timing pulses for causing successive changing of said logic states; means for adjusting the timing of generation of said timing pulses thereby to preselect the length of the respective operating period defined by each of said logic states; flasher control means for terminating traffic control operation of said system and initiating flasher operation of predetermined one of said signal lights, and thereafter reverting to traffic control operation, said flasher control means comprising flasher logic means for permitting initiation of said flasher operation only during a predetermined one of said logic states and for permitting reversion to said traffic control operation only during a predetermined one of said logic states, thereby to permit transistion between flasher operation and traffic control operation only during safe traffic conditions.

14. A traffic signal controller as set forth in claim 13 wherein said flasher logic means comprises a first logic gate responsive to a predetermined one of said logic states, a second logic gate responsive to a predetermined one of said logic states, and a flip-flop adapted for being set by said first logic state to cause flasher operation and for being reset by said second logic gate to cause traffic control operation.

* * * * *

PO-1050
(5/69)

UNITED STATES PATENT OFFICE
CERTIFICATE OF CORRECTION

Patent No. 3,810,084          Dated May 7, 1974

Inventor(s) Harold C. Hoyt, Jr.

It is certified that error appears in the above-identified patent and that said Letters Patent are hereby corrected as shown below:

Col. 26, Claim 13, line 46, change "one" to ---ones---.

Signed and sealed this 24th day of September 1974.

(SEAL)
Attest:

McCOY M. GIBSON JR.
Attesting Officer

C. MARSHALL DANN
Commissioner of Patents